(12) United States Patent  
Toda et al.

(10) Patent No.: US 10,897,573 B2  
(45) Date of Patent: Jan. 19, 2021

(54) IMAGE CAPTURING SYSTEM, TERMINAL AND COMPUTER READABLE MEDIUM WHICH CORRECT IMAGES

(71) Applicants: Yoshiyuki Toda, Tokyo (JP); Yoshinaga Kato, Kanagawa (JP); Makoto Torikoshi, Kanagawa (JP); Tomohiro Ikeda, Kanagawa (JP)

(72) Inventors: Yoshiyuki Toda, Tokyo (JP); Yoshinaga Kato, Kanagawa (JP); Makoto Torikoshi, Kanagawa (JP); Tomohiro Ikeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/654,011

(22) Filed: Oct. 16, 2019

(65) Prior Publication Data  
US 2020/0162671 A1  May 21, 2020

(30) Foreign Application Priority Data

Nov. 21, 2018 (JP) ................................ 2018-218671  
May 28, 2019 (JP) ................................ 2019-099746

(51) Int. Cl.  
*H04N 5/232* (2006.01)  
*H04N 5/262* (2006.01)  
*H04N 5/225* (2006.01)

(52) U.S. Cl.  
CPC ....... *H04N 5/23238* (2013.01); *H04N 5/2258* (2013.01); *H04N 5/2628* (2013.01)

(58) Field of Classification Search  
None  
See application file for complete search history.

(56) References Cited

U.S. PATENT DOCUMENTS

| | | | | |
|---|---|---|---|---|
| 6,205,259 B1* | 3/2001 | Komiya | ................. | H04N 9/093 382/284 |
| 6,603,503 B1* | 8/2003 | Ribera | ................... | G02B 13/06 348/48 |
| 2001/0010555 A1* | 8/2001 | Driscoll, Jr. | ........... | H04N 7/183 348/335 |
| 2006/0197843 A1* | 9/2006 | Yoshimatsu | ......... | H04N 5/2628 348/219.1 |
| 2008/0310680 A1* | 12/2008 | Azuma | ............. | G06K 9/00791 382/104 |
| 2014/0267809 A1* | 9/2014 | Tsubaki | ............. | H04N 5/23287 348/208.6 |
| 2015/0016746 A1* | 1/2015 | Tsubota | ................... | G06T 3/00 382/275 |
| 2016/0137126 A1* | 5/2016 | Fursich | ............. | H04N 5/23238 348/38 |
| 2016/0165123 A1* | 6/2016 | Ikushima | ............. | G01B 11/272 348/135 |

(Continued)

FOREIGN PATENT DOCUMENTS

JP  2016-149733 A  8/2016

*Primary Examiner* — Jefferey F Harold  
*Assistant Examiner* — Mustafizur Rahman  
(74) *Attorney, Agent, or Firm* — Xsensus LLP

(57) ABSTRACT

An image system includes processing circuitry. The processing circuitry captures an image captured by a device such as a camera, and detects an attitude of the device. The processing circuitry corrects the captured image based on the attitude of the device and a designation including a point on the image and at least one of a region of the image and a direction.

17 Claims, 13 Drawing Sheets

(56) References Cited

U.S. PATENT DOCUMENTS

| | | | |
|---|---|---|---|
| 2016/0205308 A1* | 7/2016 | Maeda | H04N 5/23229 |
| | | | 348/207.11 |
| 2016/0381282 A1* | 12/2016 | Bandlamudi | H04N 5/23293 |
| | | | 348/240.3 |
| 2017/0001821 A1* | 1/2017 | Sato | H04N 5/2257 |
| 2017/0134661 A1* | 5/2017 | Chietein | B60R 1/002 |
| 2017/0289447 A1* | 10/2017 | Nakao | G06K 9/00637 |
| 2018/0084197 A1* | 3/2018 | Lee | H04N 5/23293 |
| 2019/0020850 A1* | 1/2019 | Meyers | H04N 5/2173 |
| 2019/0080197 A1 | 3/2019 | Kato | |
| 2020/0014843 A1* | 1/2020 | Ogawa | G06F 3/04883 |
| 2020/0081266 A1* | 3/2020 | Ohtomo | G01C 11/06 |

* cited by examiner

IMAGE CAPTURING SYSTEM, TERMINAL AND COMPUTER READABLE MEDIUM WHICH CORRECT IMAGES

CROSS-REFERENCE TO RELATED APPLICATIONS

This patent application is based on and claims priority pursuant to 35 U.S.C. § 119(a) to Japanese Patent Application No. 2018-218671, filed on Nov. 21, 2018, and 2019-099746, filed on May 28, 2019, in the Japan Patent Office, the entire disclosure of which is incorporated herein by reference.

BACKGROUND

Technical Field

The present disclosure relates to an image capturing system, a terminal and a computer readable medium.

Description of the Related Art

Cameras that capture images of wide-angle views such as hemispheres and omnidirectional spheres are known.

For example, there is a spherical panoramic video capture system equipped with an omnidirectional camera. This omnidirectional camera has two imaging optical systems each having a fisheye lens, and two imaging elements. The omnidirectional camera combines the images captured by the two imaging elements to generate an image with a solid angle of $4\pi$ steradian, that is, an omnidirectional image. Steradian is the Standard International unit of solid angle. It is used in three-dimensional geometry and is analogous to the radian which quantifies planar angles. The spherical panoramic video capture system makes the vertical direction of the omnidirectional image proper by correcting the inclination even when imaging is performed in a state where the omnidirectional camera is inclined.

SUMMARY

An image system includes processing circuitry. The processing circuitry obtains an image captured by a device such as a camera, and detects an attitude of the device. The processing circuitry corrects the captured image based on the attitude of the device and a designation including a point on the image and at least one of a region of the image and a direction.

The invention further includes a computer program and a terminal which performs the correction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

Figure 1:
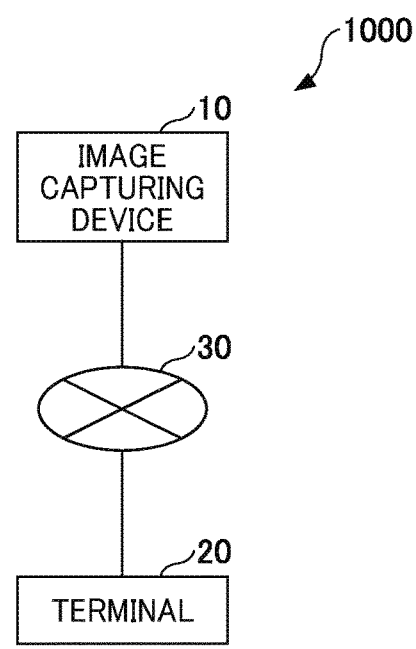
FIG. 1 is an illustration of an example of a configuration of an imaging system, according to a first embodiment of the present disclosure.

Referring to the drawings, embodiments of the present disclosure are described below. Note, in the present specification and drawings, components having substantially the same function are assigned the same reference numbers and redundant description are omitted.

First Embodiment

<Configuration of Imaging System 1000>

A configuration of an imaging system 1000 are described, according to a first embodiment of the present disclosure. FIG. 1 is illustration of an example of the configuration of the imaging system 1000, according to a first embodiment. As shown FIG. 1, the imaging system 1000 includes an imaging capturing device 10 and a terminal 20. The imaging system 1000 includes one imaging capturing device 10 and one terminal 20, according to the first embodiment, however, may include two or more imaging capturing device 10 and two or more terminal 20.

The imaging capturing device 10 and the terminal 20 communicate with each other. A captured image captured by the image capturing device 10 transmits to the terminal 20 and a viewer can view the image data transmitted at the terminal 20. The imaging capturing device 10 and the terminal 20 may be connected indirectly via the communication network 30 or may be connected directly via a wired communication or a wireless communication. The imaging capturing device 10 and the terminal 20 are connected with each other via the communication network 30. For example, in a case where two or more terminals 20 are provided, the imaging device 10 can simultaneously distribute a captured image as the image data to two or more terminals 20. The communication network 30 may be the Internet, a wired LAN (Local Area Network), a wireless LAN, a mobile communication network, a telephone network, or a communication network using other wired or wireless communication. In the present embodiment, the communication network 30 is the internet.

The imaging device 10 and the terminal 20 may each be configured by one or more devices. When the device is configured by two or more devices, the two or more devices may be disposed in one device or may be separately disposed in two or more separate devices. In the present specification and claims, "device" may mean not only one device but also a system including of a plurality of devices.

The imaging device 10 includes an imaging unit 11A (refer to FIG. 2) including a camera and so on that captures a still image and/or a video that is a digital image, and transmits the captured image to the terminal 20. The video may be a continuous video including images of a plurality of frames captured continuously or may be a time-lapse video including a plurality of still images captured at intervals. The imaging capturing device 10 captures continuous video and transmits the image data of a plurality frames of the video.

The image of one frame may be referred to as an "image frame." Further, in the present specification and claims, "image" may mean not only the image itself, but also image data which is data representing an image and an image signal which is a signal representing an image. And "image frame" may mean not only an image of one frame itself but also data indicating an image of one frame and a signal indicating an image of one frame.

The imaging unit 11A may be implemented as a camera that captures an image of a general viewing angle such as 10° to 183°, may be implemented as a camera that captures a wide-angle image having a viewing angle of up to about 180°, or may be implemented as a camera that captures an ultra-wide angle image that is a viewing angle of 180° or greater. In the present embodiment, the imaging unit 11A is described as an omnidirectional camera having a field of view of an omnidirectional sphere, but is not limited to this.

The terminal 20 is a computer device having a communication function and capable of displaying an image. Examples of the terminal 20 are a notebook PC (Personal Computer), a mobile phone, a smart device such as a smartphone and a tablet terminal, a game machine, a PDA (Personal Digital Assistant), a wearable PC, a desktop PC, a video conference terminal, an IWB (Interactive White Board: A white board with an electronic blackboard function that can communicate with other IWBs) and so on. In the present embodiment, the terminal 20 is described as a notebook PC, but is not limited to this.

<Configuration of Imaging Device 10>

Figure 2:
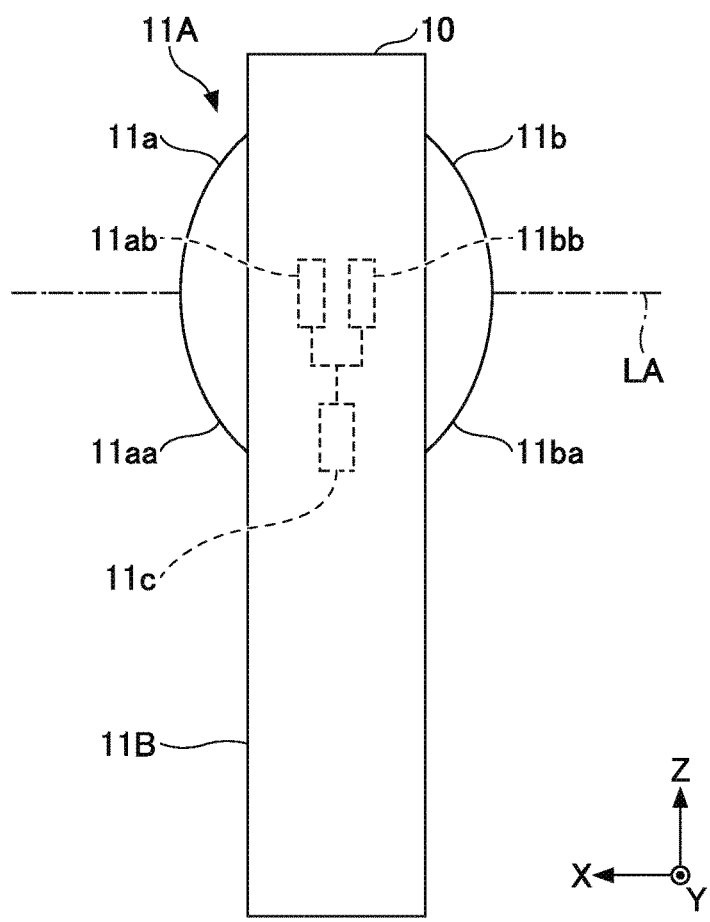
FIG. 2 is an illustration of an example of an imaging capturing device, according to a first embodiment of the present disclosure.

The configuration of the imaging device 10 is described. FIG. 2 is a side view showing an example of the imaging device 10 according to the first embodiment. As shown in FIG. 2, the imaging device 10 includes an imaging unit 11A and a housing 11B. The imaging unit 11A includes cameras 11a and 11b and a controller 11c. The housing 11B accommodates the cameras 11a and 11b and the controller 11c.

Each of the cameras 11a and 11b is an ultra-wide-angle camera having a field of view exceeding a hemisphere (angle of view exceeds 180°). The camera 11a includes an imaging optical system 11aa and a first imaging element 11ab. The camera 11b includes an imaging optical system 11ba and a second imaging element 11bb.

The imaging optical system 11aa and the imaging optical system 11ba respectively form incident images on the light receiving surfaces of the first imaging element 11ab and the second imaging element 11bb. The imaging optical system 11aa and the imaging optical system 11ba each include an optical element such as a lens, a prism, a filter, an aperture stop and so on. The lens is a lens such as a fisheye lens having an angle of view of more than 180°.

The imaging optical system 11aa and the imaging optical system 11ba are arranged such that the incident directions of light on the lenses are opposite to each other. The optical axis centers of the lenses of the imaging optical system 11aa and the imaging optical system 11ba according to one implementation have the same optical axis center LA. The imaging optical system 11aa and the imaging optical system 11ba have the same specifications, and face in opposite directions with each other so that the centers of the optical axes coincide with each other, if desired.

The first imaging element 11ab and the second imaging element 11bb include a plurality of light receiving elements arranged in an array. The light receiving element outputs a pixel value indicating the intensity of the received light. An example of a pixel value is a luminance value. The light receiving element include a plurality of pixels for capturing an image in each of the first imaging element 11ab and the second imaging element 11bb. The first imaging element 11ab and the second imaging element 11bb sequentially output image signals indicating the light distribution of the image formed on the light receiving surface by the imaging optical system 11aa and the imaging optical system 11ba as an image frame to the controller 11c.

Examples of the first imaging element 11ab and the second imaging element 11bb are a charge coupled device (CCD) image sensor and a complementary metal oxide semiconductor (CMOS) image sensor. In the present embodiment, the first imaging element 11ab and the second imaging element 11bb are the same image sensors having the same resolution and imaging element size, but are not limited thereto.

The controller 11c is a computer device implemented as a microcomputer and so on. The controller 11c combines two image frames captured by the first imaging element 11ab and the second imaging element 11bb into one image frame, and generates an image with a solid angle of $4\pi$ steradian (hereinafter, also referred to as a "spherical panoramic image") frame. The spherical panoramic image is an image that captures all directions centered on the imaging point. For example, the spherical panoramic image frame may show a planar image formed by projecting a spherical surface onto a cylinder by equidistant cylindrical projection and expanding the cylinder. Then, the spherical panoramic video includes the continuous spherical panoramic image frames.

Here, the direction of the optical axis center LA of the imaging optical system 11aa and the imaging optical system 11ba is defined as the X axis direction. A direction which is a longitudinal direction of the elongated rectangular parallelepiped housing 11B and is perpendicular to the X axis is defined as a Z axis direction. A direction perpendicular to the X axis and the Z axis is defined as a Y axis direction. A three-dimensional coordinate system consisting of XYZ axes constitutes a camera coordinate system of the imaging capturing device 10. The camera coordinate system is fixed to the imaging capturing device 10, and changes the direction of the coordinate axis according to the change in posture of the imaging capturing device 10.

<Hardware Configuration of the Imaging Capturing Device 10>

Figure 3:
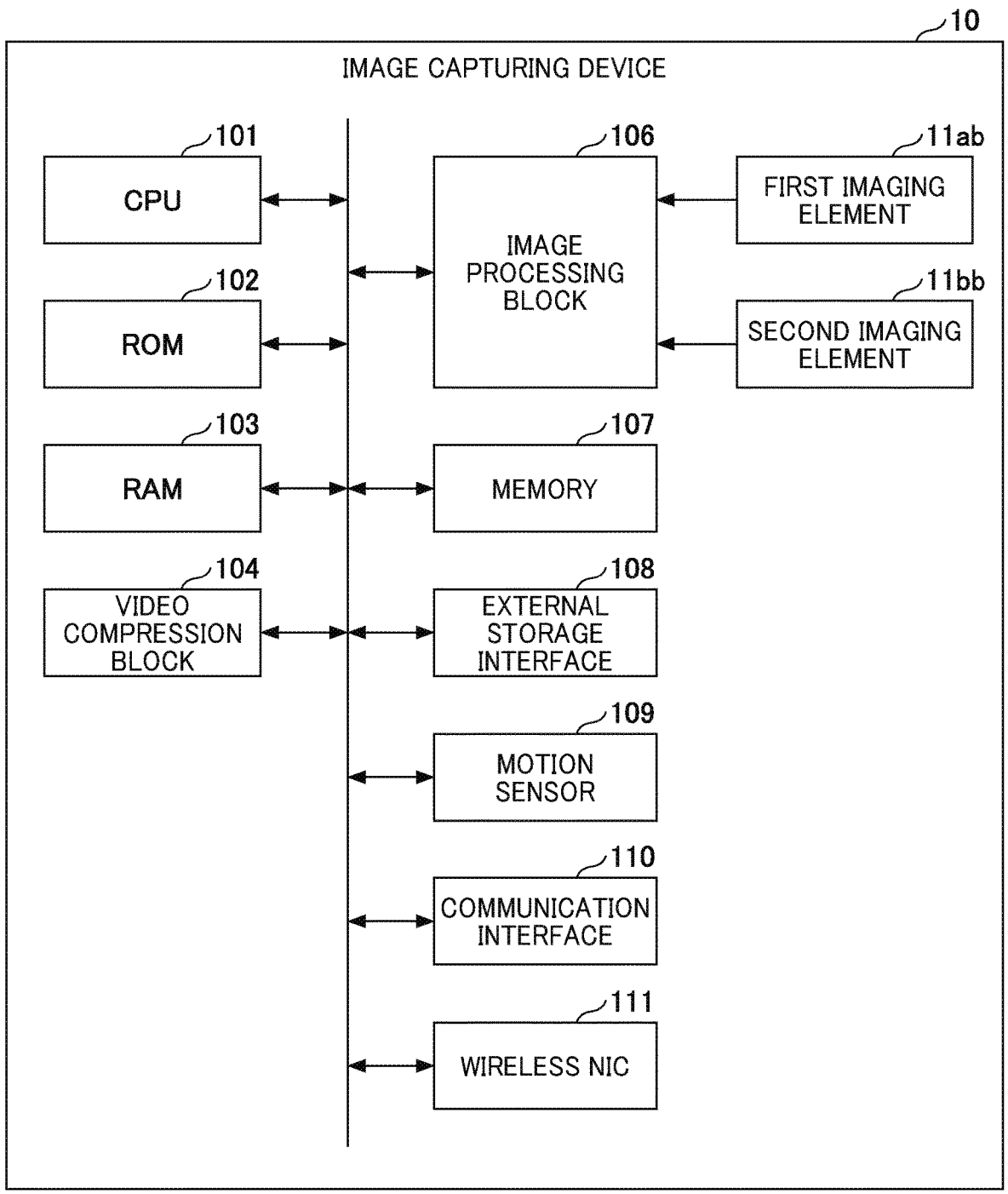
FIG. 3 is an illustration of an example of a hardware configuration of an imaging capturing device, according to a first embodiment of the present disclosure.

The hardware configuration of the imaging device 10 is described. FIG. 3 is a diagram illustrating an example of a hardware configuration of the imaging device 10 according to the first embodiment. As illustrated in FIG. 3, the imaging device 10 includes a central processing unit (CPU) 101, a read only memory (ROM) 102, a random access memory As illustrated in FIG. 3, the imaging device 10 includes a central processing unit (CPU) 101, a read only memory (ROM) 102, a random access memory (RAM) 103, a video compression block 104, a first imaging element 11ab, a second imaging element 11bb, an image processing block 106, a memory 107, an external storage interface (I/F: interface) 108, a motion sensor 109, a communication I/F 110, and wireless NIC (Network Interface Card) 111 as components. (RAM) 103, a video compression block 104, a first imaging element 11ab, a second imaging element 11bb, an image processing block 106, a memory 107, an external storage interface (I/F: interface) 108, a motion sensor 109, a communication I/F 110, and wireless NIC (Network Interface Card) 111 as components. Note that all of these components are not essential. Also, for example, the above components are connected to one another via a bus. The above components may be connected via either wired communication or wireless communication.

The CPU 101 is implemented as a processor and so on, and controls the operation and overall operation of the elements of the imaging capturing device 10. For example, the CPU 101 may be used to implement the controller 11c of FIG. 2. The ROM 102 may be implemented by a non-volatile semiconductor storage device and so on, and stores various programs and various parameters operated by the imaging capturing device 10. A random access memory (RAM) 103 is implemented by a volatile semiconductor memory device or the like, and is used as a work area of the CPU 101. The RAM 103 provides a storage area for temporarily storing data when performing various signal processing and image processing. The memory 107 stores various information such as data used in various programs and images captured by the first imaging element 11ab and the second imaging element 11bb and so on. The memory 107 is implemented by a volatile or non-volatile semiconductor memory, a storage device such as a hard disk drive (HDD) or a solid state drive (SSD). The memory 107 may include the ROM 102 and/or the RAM 103.

The program is stored in advance in the ROM 102 or the memory 107 and so on. The program is read by the CPU 101 from the ROM 102 or the memory 107 and so on to the RAM 103 and developed. The CPU 101 executes each coded instruction in a program developed in the RAM 103. For example, the program may be stored in a recording medium such as a recording disk not limited to the ROM 102 and the memory 107. Also, the program may be transmitted via a wired network, a wireless network, broadcast and so on, and may be written into the RAM 103.

The functions realized by the CPU 101 and/or the other elements or FIG. 3 described above may be realized by a program execution unit such as the CPU 101 or the like which includes internal circuits or circuitry, may be realized by a circuit, or may be realized by a combination of a program execution unit and a circuit. For example, such a function may be realized by an LSI (Large Scale Integration) which is an integrated circuit. Such functions may be individually integrated into one chip, or may be integrated into one chip which performs other functions. As an LSI, a field programmable gate array (FPGA) that can be programmed after LSI fabrication, a reconfigurable processor that can reconfigure connections and/or settings of circuit cells in the LSI, or an application specific integrated circuit (ASIC) and so on in which a plurality of functional circuits are combined into one for specific use may be used.

The image processing block 106 is connected to the two imaging elements 11ab and 11bb, and receives an image signal of an image captured by each of the first imaging element 11ab and the second imaging element 11bb. The image processing block 106 includes an ISP (Image Signal Processor) and so on, and performs processing such as shading correction, Bayer interpolation, white balance correction, and gamma correction on the image signals input from the first imaging element 11ab and the second imaging element 11bb. Further, the image processing block 106 combines two image frames obtained from each of the first imaging element 11ab and the second imaging element 11bb to generate a spherical panoramic image frame. In other words, the image processing block 106 combines two image frames captured at or near the same time to the one spherical panoramic image frame. More specifically, in the image processing block 106, each spherical panoramic image including complementary hemispherical portions is first generated from each captured image configured as a planar image. Then, two spherical panoramic images including the hemispherical portions are aligned based on the matching of the overlapping area, and are synthesized and a spherical panoramic image frame is generated including the entire spherical panoramic.

The video compression block 104 is a codec block that performs video compression and decompression such as MPEG-4 AVC/H.H.265 and so on. The video compression block 104 compresses the data of the spherical panoramic image frame generated by the image processing block 106 into a video format data.

The motion sensor 109 includes an acceleration sensor, an angular velocity sensor (also referred to as a "gyro sensor"), and a geomagnetic sensor. The acceleration sensor detects acceleration in three axial directions of the XYZ axes. The angular velocity sensor detects the angular velocity around the three axes. The geomagnetic sensor detects magnetic fields in the three axial directions. Such a motion sensor 109 constitutes a nine-axis attitude sensor. The motion sensor 109 calculates a roll angle around the X axis, a pitch angle around the Y axis, and a yaw angle around the Z axis in the imaging device 10 using the detection values of the respective sensors. The roll angle indicates the attitude of the imaging device 10 in the rolling direction, the pitch angle indicates the attitude of the imaging device 10 in the pitching direction, and the yaw angle indicates the attitude of the imaging capturing device 10 in the yawing direction.

The motion sensor 109 calculates a roll angle, a pitch angle, and a yaw angle each time more frequently, or less frequently than when an image frame is captured. The motion sensor 109 may calculate a roll angle, a pitch angle, and a yaw angle between image frames, or may calculate a roll angle, a pitch angle, and a yaw angle with respect to a reference posture of the imaging capturing device 10. The motion sensor 109 may output the detection value of each sensor to the CPU 101, and the CPU 101 may calculate the roll angle, the pitch angle, and the yaw angle. The motion sensor 109 may include at least an acceleration sensor and an angular velocity sensor.

An external storage memory such as a storage medium is connected to the external storage interface (F) 108. For example, the external storage I/F 108 controls reading and writing to an external storage such as a memory card and so on, which is an example of a storage medium inserted in a memory card slot.

The communication I/F 110 is an interface connected to another device or device to transmit and receive information. For example, the communication I/F 110 may be connected to another device via wired communication or wireless communication. The communication I/F 110 may include a USB (Universal Serial Bus) connector and so on.

The wireless NIC 111 is a device for communicating with another device such as the terminal 20 via the communication network 30. The wireless NIC 111 may include a connection terminal, a communication circuit and so on. The wireless NIC 111 may communicate using any desired communication protocol such as any WiFi or 802.XX standard or using a Bluetooth standard, for example.

<Hardware Configuration of Terminal 20>

Figure 4:
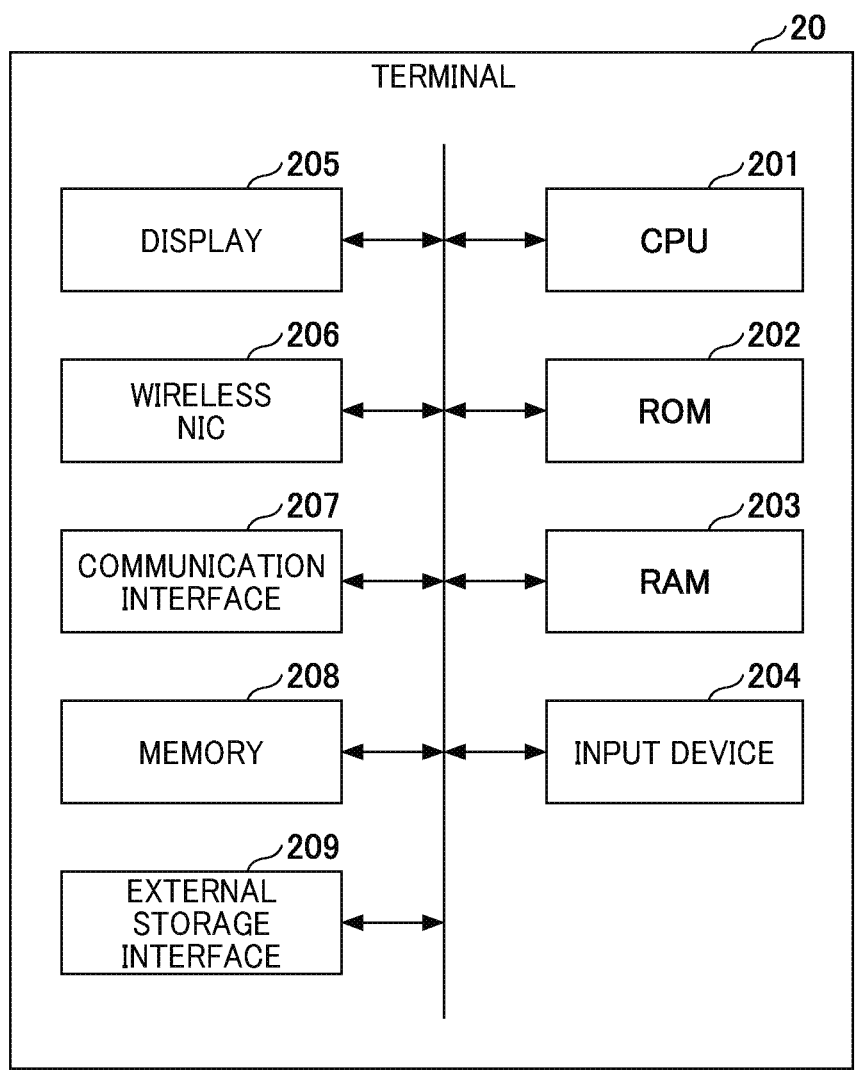
FIG. 4 is an illustration of an example of a hardware configuration of a terminal, according to a first embodiment of the present disclosure.

The hardware configuration of the terminal 20 is described. FIG. 4 is illustrating an example of a hardware configuration of the terminal 20 according to the first embodiment. As shown in FIG. 4, the terminal 20 includes a CPU 201, a ROM 202, a RAM 203, an input device 204, a display 205, a wireless NIC 206, a communication I/F 207, a memory 208, and an external storage I/F 209. Note that all of these components are not essential. In addition, for example, although the above-described components are connected to one another via a bus, they may be connected via either wired communication or wireless communication.

The configuration of each of the CPU 201, the ROM 202 and the RAM 203 is the same as that of the CPU 101, the ROM 102 and the RAM 103. The CPU 201 controls the operation and overall operation of each part of the terminal 20. The ROM 202 stores various programs operating on the terminal 20 and so on. The RAM 203 is used as a work area of the CPU 201.

The memory 208 stores various information such as data used in various programs and an image acquired from the imaging capturing device 10. The configuration of the memory 208 is similar to that of the memory 107.

The functions implemented by the CPU 201 may be implemented by a program execution unit such as the CPU 201 or may be implemented by a circuit or may be implemented by a combination of a program execution unit and a circuit.

The wireless NIC 206 is a device for communicating with another device such as the imaging capturing device 10 via the communication network 30. The wireless NIC 206 may include a connection terminal, a communication circuit, and so on.

The communication I/F 207 is an interface connected to another device or device to transmit and receive information. For example, the communication I/F 207 may be connected to another device via wired communication or wireless communication. The communication I/F 207 may include a USB connector and so on.

An external storage such as a storage medium is connected to the external storage I/F 209. The external storage I/F 209 controls reading and writing of/to the connected storage medium.

The input device 204 is a device that receives operation input from the user. The input device 204 may include input devices such as buttons, dials, keys, a mouse, a touch panel, and a microphone for voice input and so on.

The display 205 displays various screens according to the control of the CPU 201. The display 205 may be a display such as a liquid crystal panel, an organic EL (Electroluminescence) such as an OLED, an inorganic EL and so on. Display 205 may include a speaker for audio output. The display 205 may be a touch panel that doubles as the input device 204.

<Functional Configuration of Imaging Capturing Device 10>

Figure 5:
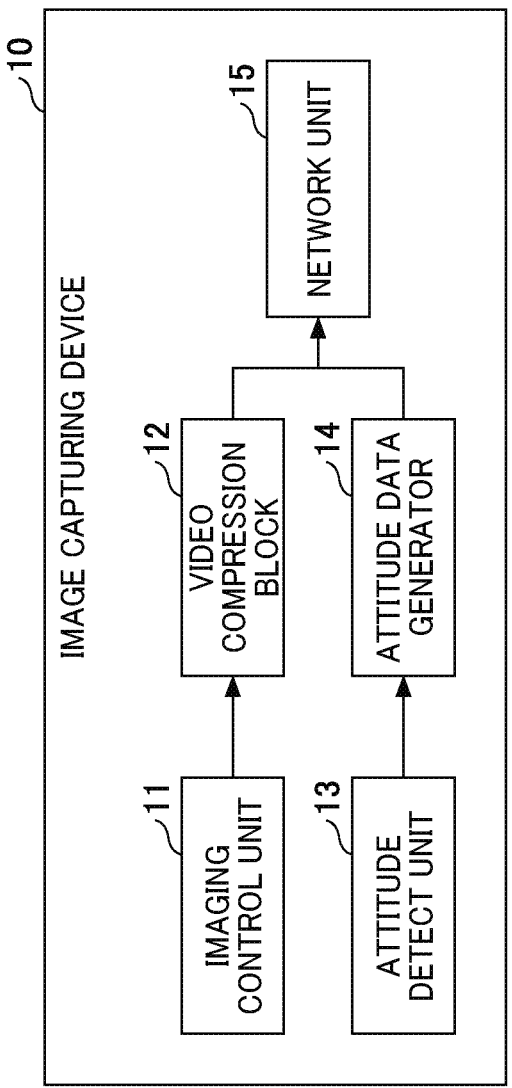
FIG. 5 is a block diagram illustrating of an example of a functional configuration of an imaging capturing device, according to a first embodiment of the present disclosure.

The functional configuration of the imaging capturing device 10 is described. FIG. 5 is an illustrating an example of a functional configuration of the imaging capturing device 10 according to the first embodiment. As shown in FIG. 5, the imaging capturing device 10 includes an imaging control unit 11, a video compression unit 12, an attitude detection unit 13, an attitude data generator 14, and a network unit 15 as functional components.

The function of the imaging control unit 11 is realized by the CPU 101, the image processing block 106, and so on. The imaging control unit 11 controls the first imaging element 11ab and the second imaging element 11bb to perform capturing, and acquires data of image frames captured by the first imaging element 11ab and the second imaging element 11bb. Furthermore, the imaging control unit 11 combines two image frames captured at the same time or an approximate time by the first imaging element 11ab and the second imaging element 11bb, and generates a spherical panoramic image frame. The imaging control unit 11 sequentially outputs the generated omnidirectional image frames to the video compression unit 12.

The function of the video compression unit 12 is realized by the CPU 101, the video compression block 104, and so on. The video compression unit 12 compresses the spherical panoramic image frame acquired from the imaging control unit 11 into video format data, and outputs the data to the network unit 15. Here, the video compression unit 12 is an example of a generation unit.

The function of the attitude detect unit 13 is realized by the CPU 101 and so on. The attitude detect unit 13 controls the motion sensor 109 and acquires attitude information of the imaging capturing device 10 from the motion sensor 109. That is, the attitude detect unit 13 detects the attitude of the imaging capturing device 10. The attitude information may be time-series data of each detection value of the motion sensor 109. Time-series data is data that includes a detection value and its detection time in association with each other. For example, the attitude detect unit 13 may acquire, from the time-series data, detection values detected by the motion sensor 109 at timing when the spherical panoramic image frame is captured by the first imaging element 11ab and the second imaging element 11bb. The timing may be at or near the imaging time of the spherical panoramic image frame.

The function of the attitude data generation unit 14 is realized by the CPU 101, the motion sensor 109, and so on. The attitude data generation unit 14 generates a parameter indicating an attitude as attitude data indicating the attitude of the imaging capturing device 10 using the attitude information acquired from the attitude detect unit 13. Examples of parameters indicating attitude are yaw angle, pitch angle and roll angle. The attitude data generator 14 outputs attitude data to the network unit 15.

The function of the network unit 15 is realized by the CPU 101, the wireless NIC 111, and/or the communication interface 110 and so on. The network unit 15 associates the video format data with the attitude data of the imaging capturing device 10, and transmits the data to the terminal 20 via the communication network 30. At this time, the network unit 15 may associate the frame of each time included in the video format data with the parameter of each time included in the attitude data based on the time. Here, the network unit 15 is an example of a transmission unit.

<Functional Configuration of Terminal 20>

Figure 6:
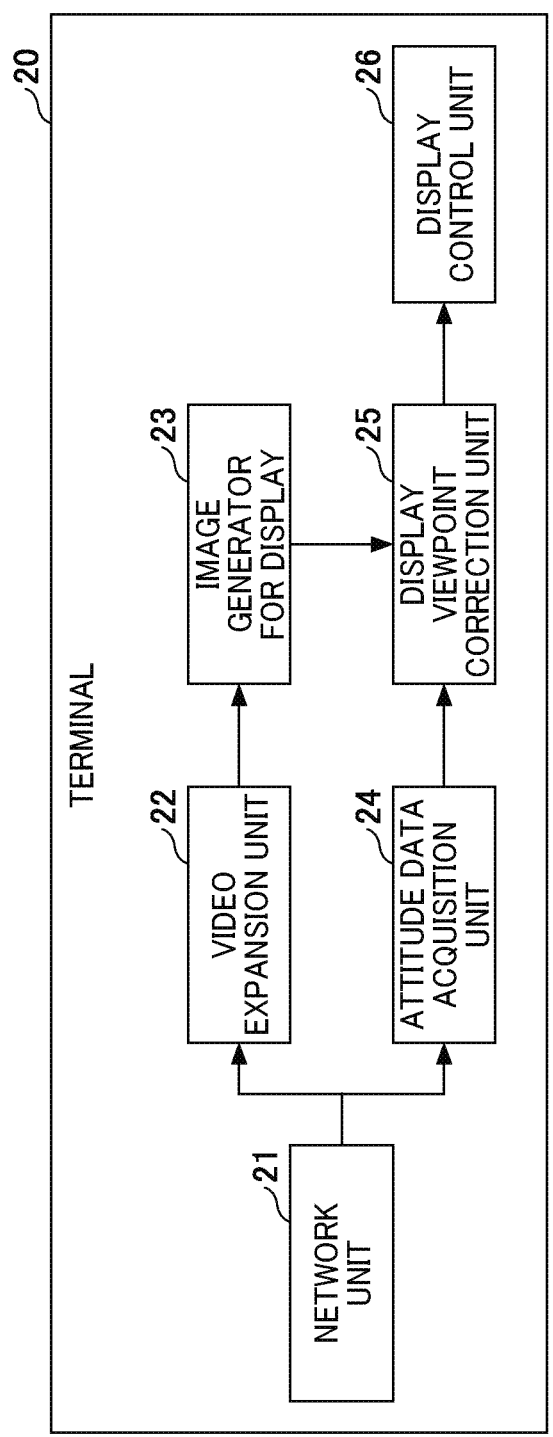
FIG. 6 is a block diagram illustrating of an example of a functional configuration of a terminal, according to a first embodiment of the present disclosure.

The functional configuration of the terminal 20 is described. FIG. 6 is a block diagram illustrating an example of a functional configuration of the terminal 20 according to the first embodiment. As shown in FIG. 6, the terminal 20 includes a network unit 21, a video expansion unit 22, a display image generator 23, an attitude data acquisition unit 24, a display viewpoint correction unit 25, and a display control unit 26 as a functional component.

The function of the network unit 21 is realized by the CPU 201, the wireless NIC 206 and so on. The network unit 21 receives, that is, acquires the video format data transmitted by the network unit 15 of the imaging capturing device 10 and the attitude data of the imaging capturing device 10. The communication unit 21 outputs the video format data to the video expansion unit 22, and outputs attitude data to the attitude data acquisition unit 24. Here, the network unit 21 is an example of an acquisition unit.

The function of the video expansion unit 22 is realized by the CPU 201 and so on. The video expansion unit 22 expands the compressed video format data into a displayable image frame data, and outputs the data to the display image generator 23. That is, the video expansion unit 22 develops the video format data into the individual image frame data. Here, the video expansion unit 22 is an example of an expansion unit.

The function of the attitude data acquisition unit 24 is realized by the CPU 201 and so on. The attitude data acquisition unit 24 acquires attitude data of the imaging capturing device 10 via the network unit 21 and outputs the acquired attitude data to the display viewpoint correction unit 25.

The function of the display image generator 23 is realized by the CPU 201 and so on. The display image generator 23 converts the image frame data developed from the video format data into data of a form in which the image frame is attached to a virtual spherical surface. That is, the display image generator 23 converts a planar image frame represented by the equidistant cylindrical projection into a spherical panoramic image frame. The display image generator 23 outputs data of a spherical panoramic image frame to the display viewpoint correction unit 25.

Figure 7A:
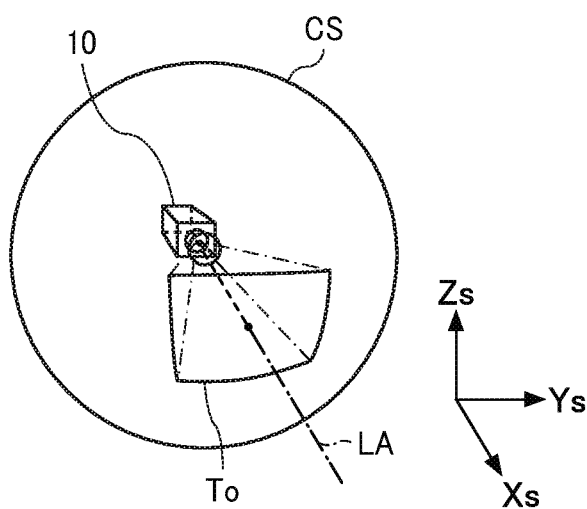
FIG. 7A is an illustration of an example of conversion from a planar image frame to a spherical panoramic image frame by a display image generator according to a first embodiment.
Figure 7B:
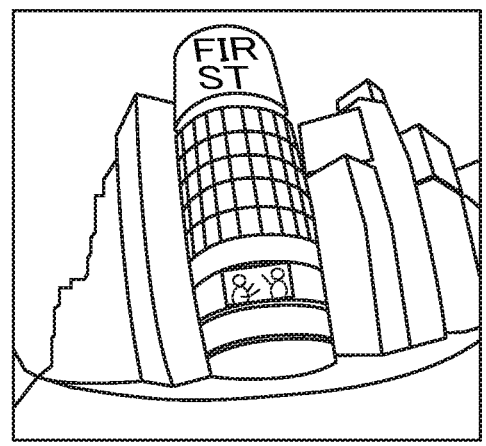
FIG. 7B is an illustration of an example of an image on a center of optical axis in a spherical panoramic image frame of FIG. 7A.

FIG. 7A is an illustrating an example of conversion from a planar image frame to a spherical panoramic image frame by the display image generator 23 according to the first embodiment. FIG. 7B is an illustrating an example of an image on the optical axis center LA in the spherical panoramic image frame of FIG. 7A. An example of this image is obtained by perspective projection processing of a three-dimensional model attached to a spherical surface.

As shown in FIG. 7A, the planar image frame developed from the data in the video format is attached to the spherical surface of the virtual solid sphere CS centered on the imaging capturing device 10, that is, the projected spherical image converted to a frame. At this time, for example, in the display image generation unit 23, a three-dimensional coordinate system including XYZ axes set in the imaging capturing device 10 corresponds to a three-dimensional coordinate system including XsYsZs axes set in the solid sphere CS. That is, conversion may be performed so that the respective axes coincide. The three-dimensional coordinate system consisting of the XsYsZs axes is a world coordinate system. The world coordinate system is a coordinate system fixed regardless of the attitude of the imaging device 10. The Zs axis direction is the gravity direction, that is, the vertical direction, and the Xs axis direction and the Ys axis direction are horizontal directions.

In such a spherical panoramic image frame, an image of a region TO centered on the intersection of the optical axis center LA of the imaging device 10 and the spherical surface is represented as an image as shown in FIG. 7B. For all axes passing through the center of the solid sphere CS, an image of a region centered on the intersection of the axis and the sphere is similarly represented.

The function of the display viewpoint correction unit 25 is realized by the CPU 201 and so on. The display viewpoint correction unit 25 corrects the direction of the center of the optical axis in the spherical panoramic image frame based on the attitude data. Furthermore, the display viewpoint correction unit 25 forms a spherical panoramic image frame, which is a planar image frame obtained by expanding an image frame of a spherical surface by equidistant cylindrical projection and so on centering on the optical axis center after correction, and output to display control unit 26. Here, the display viewpoint correction unit 25 is an example of a correction unit.

The function of the display control unit 26 is realized by the CPU 201 and so on. The display control unit 26 causes the display 205 to display the image frame acquired from the display viewpoint correction unit 25. For example, the display control unit 26 sequentially displays a plurality of image frames constituting a moving image, and displays the moving image. Here, the display control unit 26 is an example of a display unit.

Details of the display viewpoint correction unit 25 is described. For example, on the screen of the spherical panoramic image of the imaging capturing device 10 displayed on the display 205 of the terminal 20, the user designates a display portion such as a point or a region using the input device 204. At this time, the display viewpoint correction unit 25 corrects the spherical panoramic image frame so as to display the spherical panoramic image maintaining the position of the display portion on the screen. Even when the imaging capturing device 10 is rotated and the direction of the optical axis center LA changes, the display viewpoint correction unit 25 maintains the position of the display portion with respect to the spherical panoramic image displayed on the screen. Therefore, the display viewpoint correction unit 25 maintains the viewpoint on the display portion. In addition, the designation method of a display part is not limited to a point and an area or region, any method may be used.

A case where a rectangular designated area T is designated as a display portion on the screen of the display 205 is described. In this case, the display viewpoint correction unit 25 projects the designated area T on the spherical surface of the solid sphere CS as shown in FIG. 7A. Furthermore, the display viewpoint correction unit 25 calculates the position of the central point CP of the specified region T thus projected on the spherical surface of the solid sphere CS.

Figure 8:
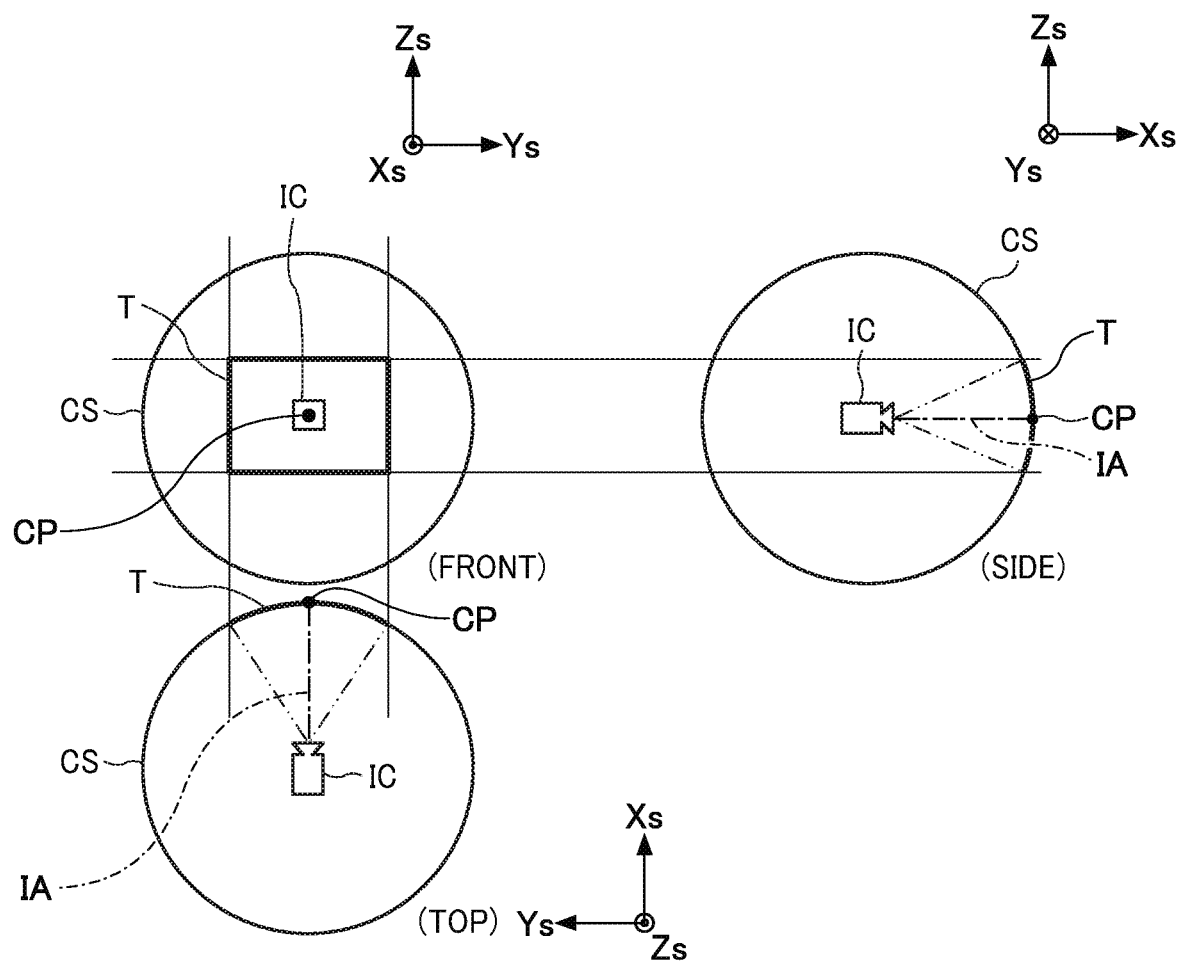
FIG. 8 is an illustration of an example of a designated area, according to a first embodiment of the present disclosure.
Figure 9:
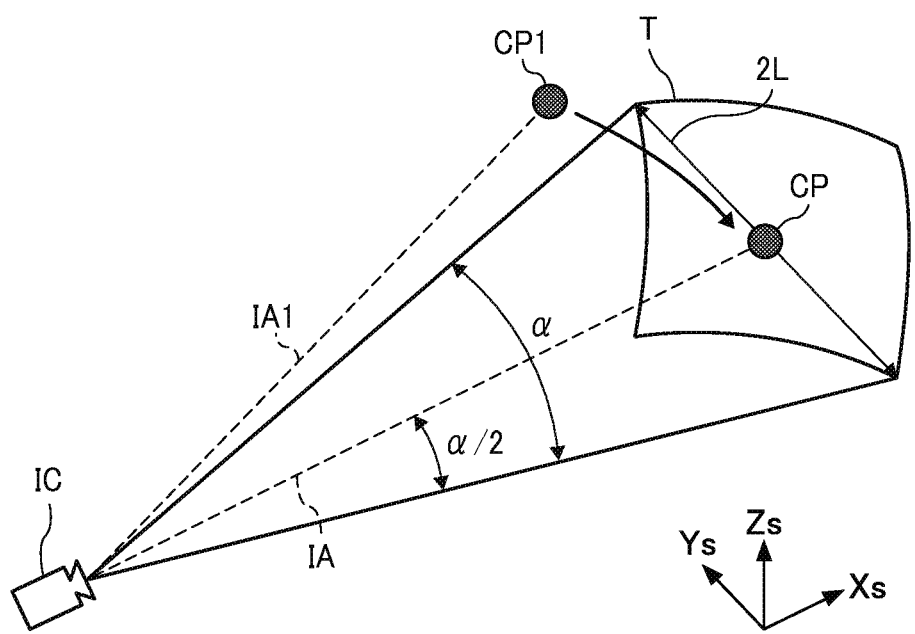
FIG. 9 is an illustration of an example of a center point of a designated area, according to a first embodiment of the present disclosure.

FIG. 8 is an illustrating an example of a designated area according to the first embodiment. FIG. 9 is an illustrating an example of the center point of the designated area according to the first embodiment. FIG. 9 shows a part of a spherical panoramic image frame on a solid sphere CS.

As shown in FIG. 8, a virtual camera IC with a designated area T as a field of view and located at the center of the solid sphere CS is assumed. The intersection of the optical axis IA of the virtual camera IC and the spherical surface of the solid sphere CS is taken as the central point CP of the designated area T. Specifically, as shown in FIG. 9, the viewing angle of the virtual camera IC with respect to the diagonal angle of view 2L of the designated area T is α. The central point CP is an intersection point of an optical axis IA which is a bisector of the viewing angle α and a diagonal of the designated area T corresponding to the diagonal angle of view 2L.

For example, when the orientation of the imaging device 10 changes as the imaging capturing device 10 moves, the roll angle θr, the pitch angle θp, and the yaw angle θy change, the direction of the optical axis center LA of the imaging capturing device 10 changes similarly. The optical axis center LA after change is set as the optical axis center LA1. The direction of the optical axis IA and the position of the center point CP also change in the same manner as the optical axis center LA. The optical axis IA after the change is taken as an optical axis IA1. The central point CP moves to the intersection CP1 of the optical axis IA1 and the solid sphere CS.

The display viewpoint correction unit 25 rotates the spherical panoramic image frame on the solid sphere CS so that the position of the central point CP on the solid sphere CS does not change before and after the attitude change. Specifically, the display viewpoint correction unit 25 rotates the image frame of the spherical surface after the attitude change about the center of the solid sphere CS so as to move the central point CP1 to the central point CP. At this time, the display viewpoint correction unit 25 may align the optical axis IA1 with the optical axis IA, or may align the optical axis center LA1 with the optical axis center LA.

For example, the display viewpoint correction unit 25 corrects each parameter of the spherical panoramic image frame after attitude change by performing coordinate conversion to move the optical axis IA1 to the optical axis IA. In the spherical panoramic image frame after coordinate conversion, the position of the central point CP1 on the solid sphere CS is the same as the central point CP before the attitude change.

As described above, the display viewpoint correction unit 25 performs coordinate conversion based on the roll angle θr, the pitch angle θp, and the yaw angle θy indicating the posture change of the imaging capturing device 10 on the spherical panoramic image frame after the attitude change. Thus, the position of the designated area T on the solid sphere CS is maintained, and the line of sight to the designated area T is maintained. Therefore, based on the information on the attitude of the imaging capturing device 10 and the information on the designated area T that is the display portion, the display viewpoint correction unit 25 corrects the spherical panoramic image frame after the attitude change so that the display portion is displayed. Then, the display viewpoint correction unit 25 maintains the position of the display portion regardless of the change in attitude of the imaging capturing device 10.

Figure 10:
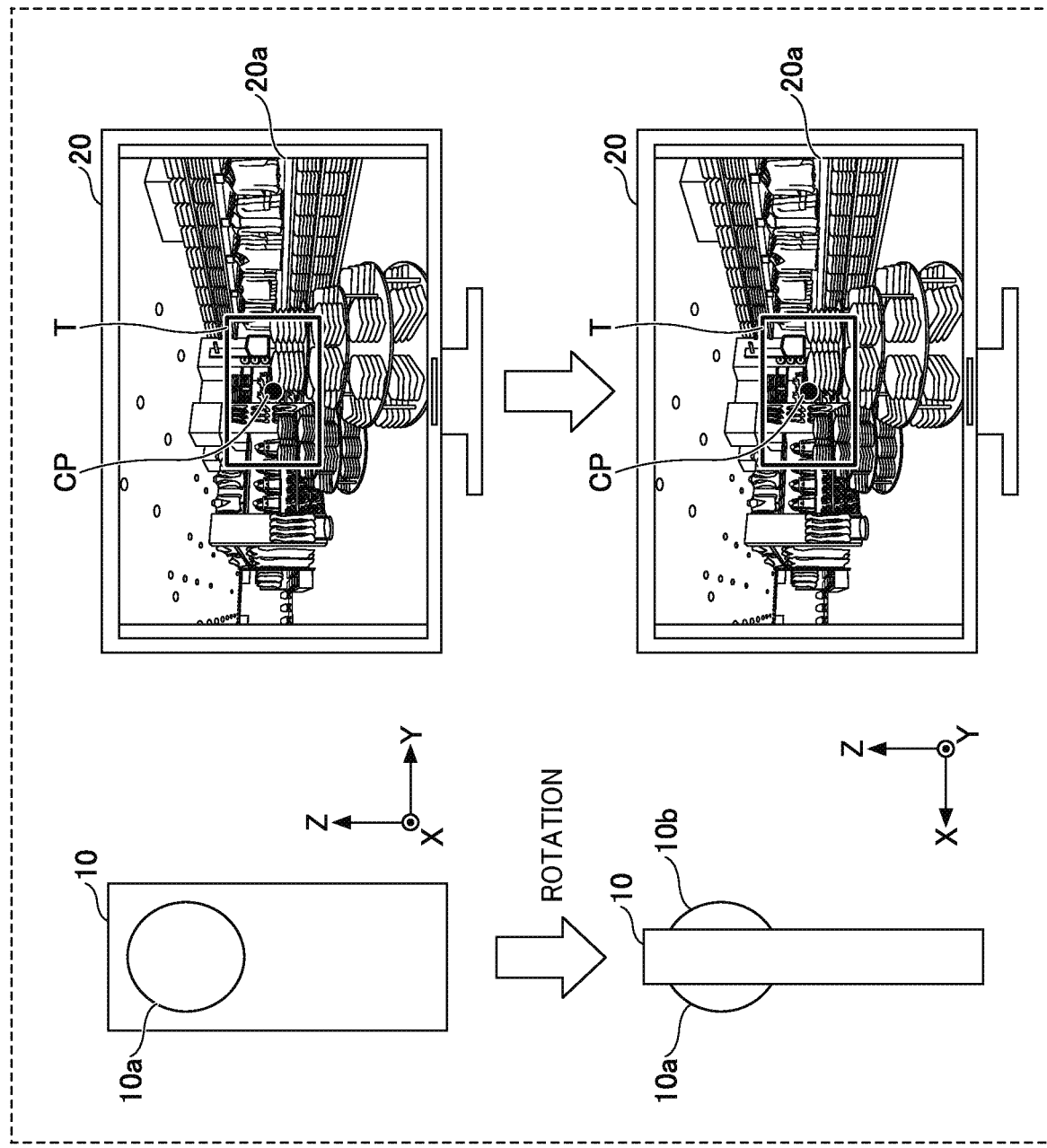
FIG. 10 is an illustration of an example of a display image of a terminal before and after the attitude change of the image capturing device, according to a first embodiment of the present disclosure.

For example, FIG. 10 is an illustrating an example of a display image of the terminal 20 before and after the attitude change of the imaging capturing device 10 according to the first embodiment. As shown in FIG. 10, in the image 20a displayed by the terminal 20, the region T is designated by the user. Thereafter, for example, when the imaging capturing device 10 is rotated about the Z axis, the terminal 20 displays the image 20a in which the position of the central point CP of the region T is maintained at the same position during and after the rotation. That is, the terminal 20 continues to display the image 20a of the same viewpoint. The point CP may be designated by the user. Also, in this case, the terminal 20 displays the image 20a in which the position of the point CP is maintained at the same position during and after the rotation. Note that the images of the same viewpoint mean that the regions T designated by the user may be included in the screen at least 75% or more of each other before and after the attitude change. However, the same viewpoint may have other thresholds such as 80%, 85%, 90%, 95% or 98% or more of each other before and after the attitude change.

<Image Distribution Operation of Imaging System 1000>

Figure 11:
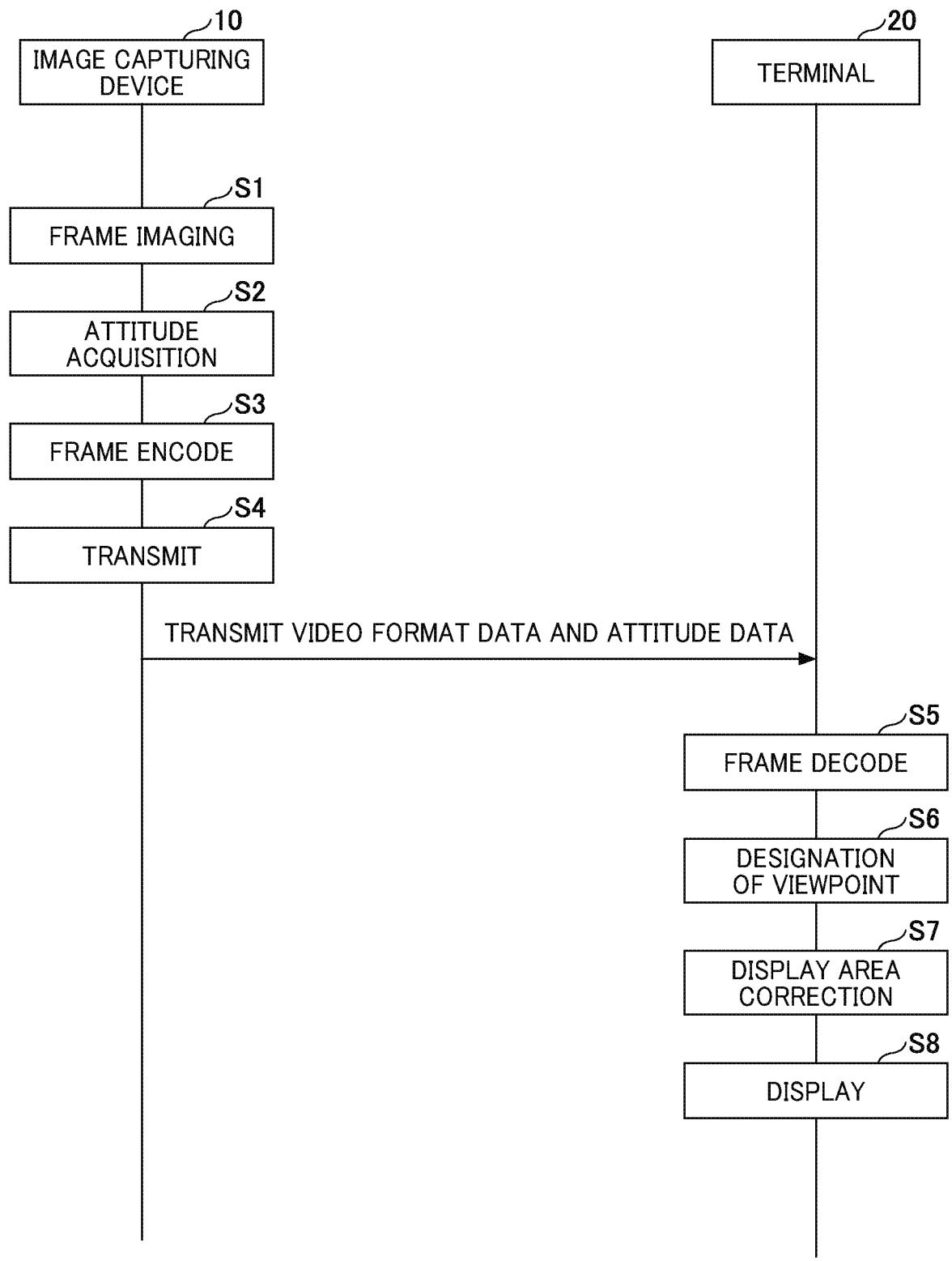
FIG. 11 is an illustration of an example of a distribution operation of an imaging capturing device, according to a first embodiment of the present disclosure.

In the imaging system 1000, an operation in which the imaging device 10 distributes an image to the terminal 20 is described. FIG. 11 is a sequence diagram illustrating of an example of an image distribution operation in the imaging system 1000 according to the first embodiment. In the following, the case where the terminal 20 receives designation of the area T as a display portion from the user in the image displayed on the display 205 is described.

As illustrated in FIG. 11, the imaging capturing device 10 acquires an image of each frame by capturing a video (step S1). At this time, the imaging capturing device 10 combines the image frames acquired from the first imaging element 11ab and the second imaging element 11bb to generate a spherical panoramic image frame.

Also, the imaging capturing device 10 acquires attitude data of the imaging capturing device 10 via the motion sensor 109 (step S2). For example, the imaging capturing device 10 acquires attitude data detected at the timing of capturing each spherical panoramic image frame (More specifically, the timing of an image frame acquired by two image sensors) from attitude data which is time-series data, and associates the attitude data with the spherical panoramic image frame. That is, the imaging capturing device 10 associates the omnidirectional image frame acquired at the same timing with the attitude data. Information associating the sphere panoramic image frame with the attitude data may be included in the spherical panoramic image frame, may be included in the attitude data, or may be included in both. The timing includes the same time as a certain time and a time approximating the time.

Next, the imaging capturing device 10 performs encoding to compress the spherical panoramic image frame into the data of the video format (step S3). Next, the imaging capturing device 10 associates the data of the video format with the attitude data, and transmits it to the terminal 20, that is, distributes it (step S4).

Next, the terminal 20 receives the data of video format and attitude data, and decodes the data of video format into displayable image frame data (step S5). Furthermore, the terminal 20 converts the data of the image frame developed from the data of the video format into a spherical panoramic image frame. Furthermore, the terminal 20 converts the data of the image frame expanded from the data of the video format into a spherical panoramic image frame to be attached to the spherical surface of the three-dimensional model.

The terminal 20 acquires information of a viewpoint (also called viewpoint position or designated area) which is a display portion designated by the user on the image displayed on the screen of the display 205 (step S6). The viewpoint information includes the position and size of a point or area designated by the user on the display image and are shown as data including the coordinate values of the world coordinate system, the coordinate values on a spherical panoramic image or other coordinate systems. In the present example, the area T is designated. The designation may be performed on the screen by point-and-click, dragging, or the like using a mouse that is an example of the input device 204.

Also, the terminal 20 sequentially corrects the display area of the spherical panoramic image frame based on the attitude data and the information of the designated area T (step S7). Specifically, the terminal 20 corrects the direction of the center of the optical axis of the spherical panoramic image frame so that the position of the designated area T displayed in the display screen of the terminal 20 does not change, regardless of the attitude change of the imaging capturing device 10 indicated by the attitude data.

Next, the terminal 20 performs projective transformation such as perspective projection transformation to sequentially convert the spherical panoramic image frame attached to the corrected spherical surface into a planar spherical panoramic image frame which is displayed on the display 205. (step S8)

<Operation of Imaging Capturing Device 10>

Figure 12:
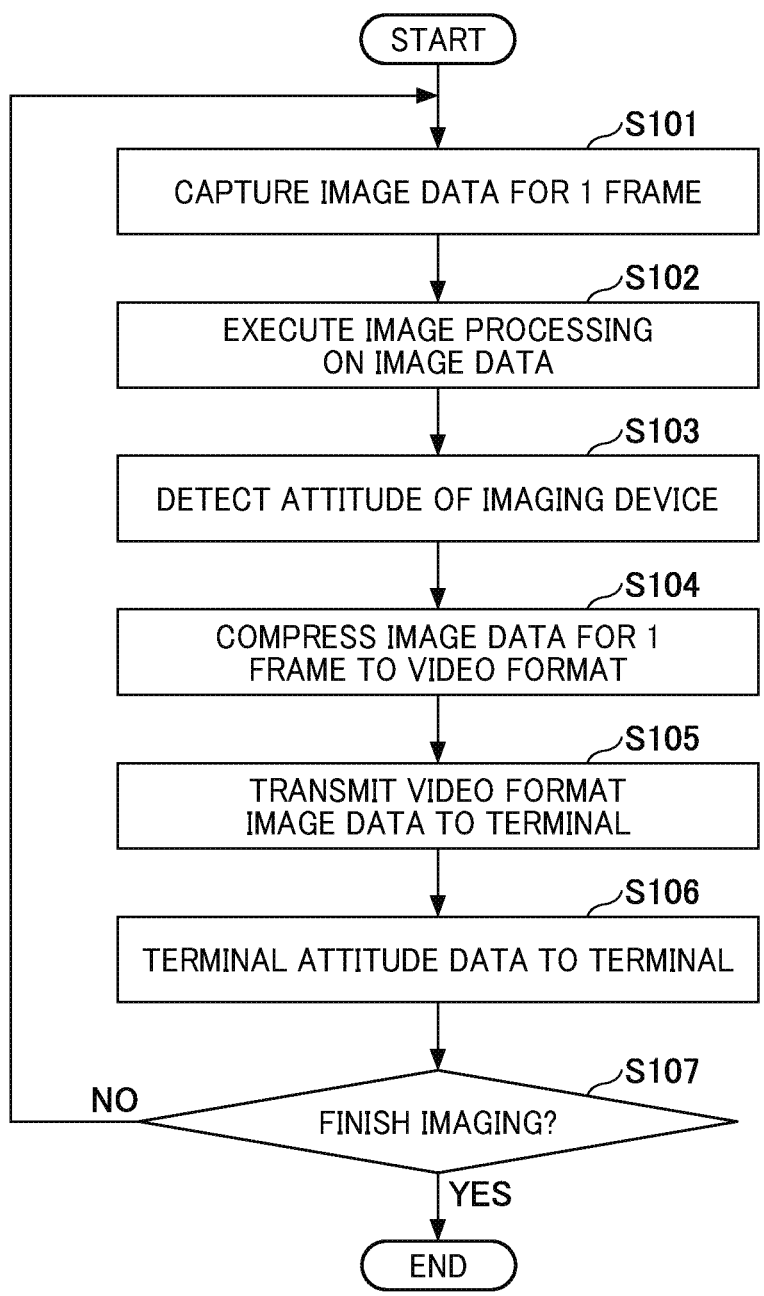
FIG. 12 is a flowchart illustrating of an example of an operation of imaging capturing device, according to a first embodiment of the present disclosure.

The operation of the imaging capturing device 10 is described. FIG. 12 is a flowchart illustrating an example of the operation of the imaging capturing device 10 according to the first embodiment. In the following, processing of the imaging capturing device 10 for image data of one frame is described.

As shown in FIG. 12, the first imaging element 11ab and the second imaging element 11bb of the imaging capturing device 10 start capturing, and the imaging control unit 11 acquires an image frame which is image data of one frame imaged by the first imaging element 11ab and the second imaging element 11bb, that is, captures (step S101).

Next, the imaging control unit 11 performs image processing on the acquired image data (step S102). Specifically, the imaging control unit 11 combines the two image frames captured by the first imaging element 11ab and the second imaging element 11bb to generate a spherical panoramic image frame.

Next, the attitude detection unit 13 detects the attitude of the imaging capturing device 10 (step S103). Specifically, the attitude detection unit 13 acquires, from the detection value of the motion sensor 109, the detection value detected at the timing when the spherical panoramic image frame is captured. Furthermore, the attitude data generator 14 generates a parameter indicating the attitude of the imaging capturing device 10 as attitude data using the detection value acquired by the attitude detection unit 13.

Next, the video compression unit 12 compresses the image data of one frame into the data of a video format (step S104). Specifically, the video compression unit 12 compresses the spherical panoramic image frame into the data of video format. Although image compression of the image data of a video format has been described as being performed for every frame, it may compress to a moving image format for every predetermined number of frames or it may compress all frames into a video format after the end of capturing, or it may be any compression or form.

Next, the network unit 15 transmits the image data of video format to the terminal 20 (step S105).

Similarly, the communication unit 15 transmits attitude data of the imaging capturing device 10 to the terminal 20 (step S106). At this time, the communication unit 15 associates the image data of the video format with the attitude data detected at the timing of capturing the image data of the video format. The communication unit 15 may include the information of associating the image data of the video format and the attitude data in the image data of the video format, or in the attitude data, or in both of them. In addition, the attitude data may be added as metadata of image data of video format and associated. When the attitude data is added as metadata, instead of transmitting attitude data to the terminal 20 as in step S106, when compressing into video format in step S104, the attitude data corresponding to each image frame may be added as metadata and compressed into video format.

Next, when the capturing by the first imaging element 11ab and the second imaging element 11bb is completed and the processing for all the image frames is completed (Yes in step S107), the imaging control unit 11 ends processing. Alternatively, if there is an unprocessed image frame (No at step S107), the process returns to step S101.

<Operation of Terminal 20>

Figure 13:
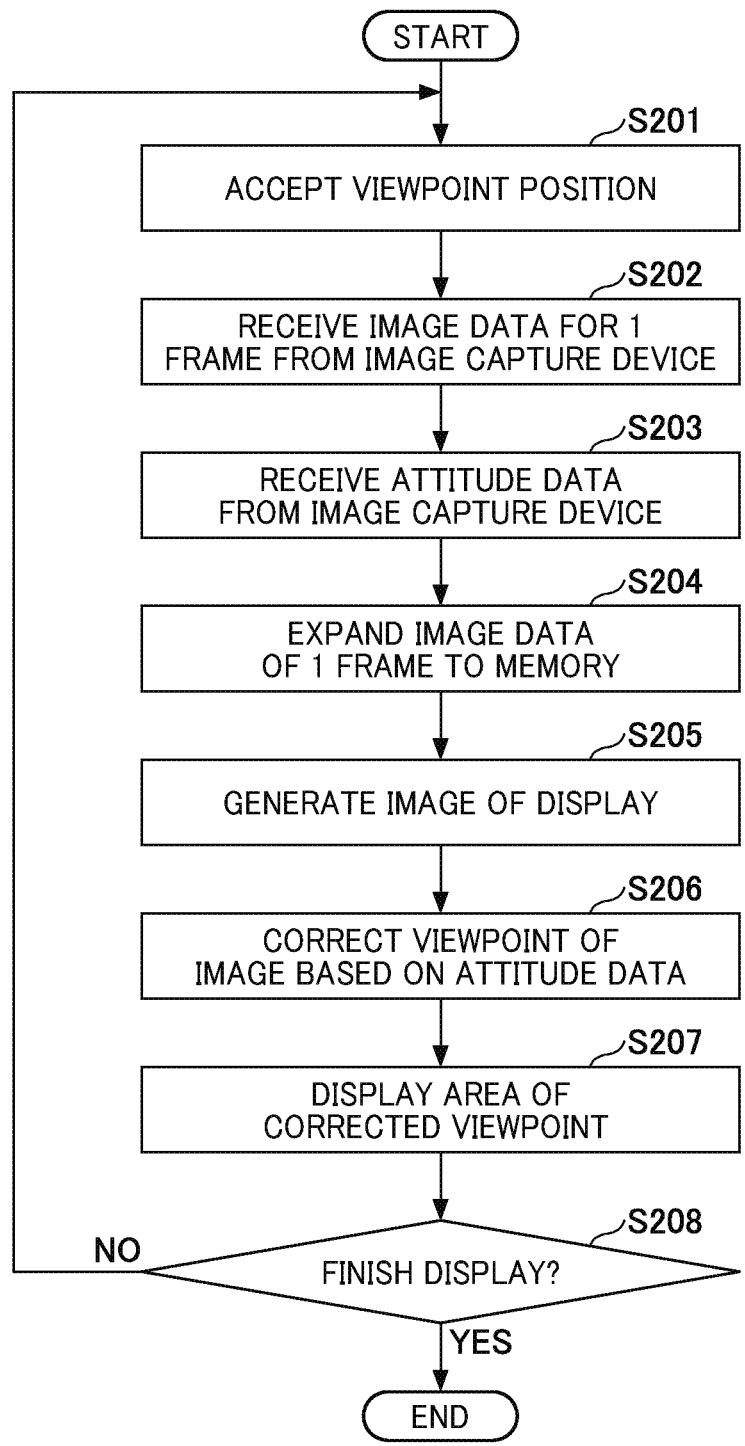
FIG. 13 is a flowchart illustrating of an example of an operation of a terminal, according to a first embodiment of the present disclosure.

The operation of the terminal 20 is described. FIG. 13 is a flowchart illustrating an example of the operation of the terminal 20 according to the first embodiment. Hereinafter, when the terminal 20 is displaying the image distributed from the imaging capturing device 10 on the display 205, an operation of the terminal 20 after the viewpoint (designated area) is designated by the user via the input device 204 is described.

As shown in FIG. 13, the terminal 20 receives designation of a viewpoint from the user on the displayed image (step S201). For example, the viewpoint is information indicating a point or an area including the coordinate values of the world coordinate system and designated on the image through an input to the input device 204.

Next, the network unit 21 receives image data of one frame, which is data of a video format, from the imaging capturing device 10 (step S202).

Similarly, the network unit 21 receives attitude data of the imaging capturing device 10 from the imaging capturing device 10 (step S203). Furthermore, as described above, in the case where attitude data is received as metadata of video format data, the step S203 is omitted. Then, the attitude data acquisition unit 24 acquires the received attitude data.

Next, the video expansion unit 22 expands image data of one frame of the video format on the RAM 103 (step S204). Specifically, the video expansion unit 22 expands image data of the video format into data of displayable image frames.

Next, the display image generator 23 converts data of displayable image frames into spherical panoramic image frames projected on the spherical surface of the three-dimensional model. That is, the display image generator 23 generates an image frame for display (step S205). Here, for example, when a spherical panoramic image frame is output into a plane image, perspective projection conversion is performed.

Next, the display viewpoint correction unit 25 corrects the display viewpoint in the spherical panoramic image frame based on the attitude data (step S206). At this time, the display viewpoint correction unit 25 performs correction by associating attitude data and a spherical panoramic image frame in which the detection timing of the attitude data and the capturing timing of the image forming the spherical panoramic image frame are the same. Then, the display viewpoint correction unit 25 corrects the orientation of spherical panoramic image frame so that the viewpoint designated in step S201 does not change on the screen of the terminal 20 due to the change in the attitude of the imaging capturing device 10 indicated by the attitude data, that is, the direction of the optical axis center LA is corrected. Therefore, the display viewpoint correction unit 25 corrects the viewpoint that may change due to the attitude change of the imaging capturing device 10 to be the position before the attitude change. Furthermore, the display viewpoint correction unit 25 forms a spherical panoramic image frame, which is a planar image frame obtained by expanding a spherical panoramic image frame, with the center of the optical axis after correction as a center.

Next, the display control unit 26 causes the display 205 to display the image frame after correction acquired from the display viewpoint correction unit 25. That is, the display control unit 26 displays the area T at the viewpoint after correction (step S207). Thus, the display 205 displays an image of the same viewpoint.

Next, when the display control unit 26 ends the display on the display 205 of all the image frames transmitted from the imaging capturing device 10 (Yes in step S208), the series of processing ends. If the display control unit 26 does not end (No in step S208), flow returns to step S201.

In step S201, when the terminal 20 receives a change in the viewpoint from the user, the terminal 20 proceeds to processing in step S202 by using the changed viewpoint. If the terminal 20 has not received a change in the viewpoint from the user, the terminal 20 proceeds to the process of step S202 by using the currently set viewpoint. When the terminal 20 receives the cancellation of the viewpoint from the user, the process proceeds to step S208.

Effect

The imaging system 1000 according to the first embodiment as described above may include the imaging unit 11A for capturing the image, the attitude detect unit 13 for detecting the attitude of the imaging unit 11A, the display viewpoint correction unit 25 as a correction unit that corrects to display the display part for image captured by the imaging unit 11A and a display control unit 26 as a display unit that displays an image after correction.

According to the above configuration, the imaging system 1000 displays an image showing the display portion even if the attitude of the imaging unit 11A changes. For example, even when the attitude of the imaging unit 11A changes and the imaging direction changes, the imaging system 1000 projects a display portion in the displayed image. Therefore, the imaging system 1000 can project a desired display target regardless of the attitude of the imaging unit 11A.

Further, in the imaging system 1000 according to the first embodiment, the display viewpoint correction unit 25 may correct the image imaged by the imaging unit 11A so as to maintain the position of the display portion with respect to the image regardless of the change in the attitude of the imaging unit 11A. According to the above configuration, the imaging system 1000 can project the display portion at the same position in the displayed image. Thus, the user does not have to look for the display portion in the image, and can visually recognize the display portion without changing the viewpoint. Therefore, visual recognition of a display part becomes easy.

Further, in the imaging system 1000 according to Embodiment 1, the attitude of the imaging unit 11A may include the attitude of the imaging unit 11A in the yawing, pitching, and rolling directions. With the above configuration, the detection accuracy of the attitude of the imaging unit 11A is improved. Therefore, the imaging system 1000 can perform correction of an image for projecting a display portion with high accuracy.

In addition, the imaging system 1000 according to the first embodiment may include the imaging capturing device 10 and the terminal 20. Then, the imaging device 10 may include an imaging unit 11A, a video compression unit 12 as a generator that generates video data from a plurality of images captured by the imaging unit 11A, an attitude detect unit 13 and a network unit 15 as a transmission unit to transmit a video data and an attitude of the imaging unit 11A to the terminal 20. In addition, the terminal 20 may include a video expansion unit 22 as an expanding unit for expanding video data into individual images, a display viewpoint correcting unit 25, and a display control unit 26. According to the above configuration, the imaging system 1000 can distribute a video from the imaging capturing device 10 to the terminal 20, and can display a display portion in the distributed video.

In addition, the terminal 20 according to the first embodiment may include the network unit 21 as an acquisition unit that acquires an image imaged by the imaging unit 11A and an information of the attitude of the imaging unit 11A, the display viewpoint correction unit 25 that corrects the image acquired by the communication unit 21 so as to display the display part based on the attitude of the imaging unit 11A and the display part specified in the image, and the display control unit 26 displays the image after correction. According to the above configuration, the terminal 20 can achieve the same effect as the imaging system 1000.

Second Embodiment

The imaging system according to the second embodiment is different from that of the first embodiment in the processing for holding the viewpoint with respect to the image displayed on the display 205. The second embodiment is described focusing on differences from the first embodiment, and the description of the same points as the first embodiment is omitted as appropriate.

The hardware configuration and the functional configuration of the imaging device and the terminal according to the second embodiment are the same as in the first embodiment, and thus the description thereof is omitted. Furthermore, in the second embodiment, reference numerals of respective components are the same as in the first embodiment.

In the present embodiment, on the image displayed on the display 205 of the terminal 20, the position of the viewpoint as the display portion and the orientation of the image are designated by the user via the input device 204. The designation method may be any designation method as long as the position of the viewpoint and the orientation of the image can be designated. For example, a point indicating the position of the viewpoint and a line indicating the orientation of the image may be designated. Alternatively, the area may be designated using a polygonal frame. From the polygon center and one side, it is possible to specify the position of the viewpoint and the orientation of the image.

Figure 14:
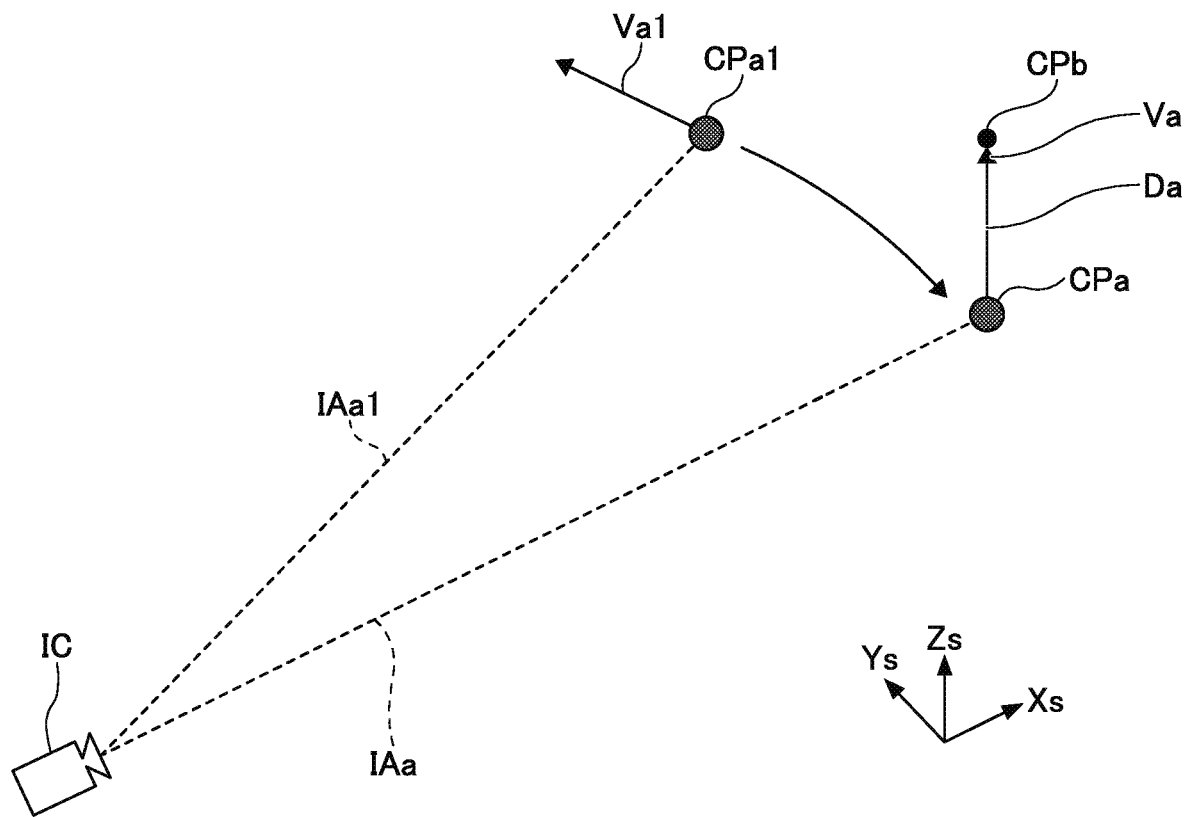
FIG. 14 is an example of a designated point and a designated direction, according to a second embodiment of the present disclosure.

The case where a point indicating the position of the viewpoint and a line indicating the direction of the image are specified is described. FIG. 14 is an illustrating an example of a designated point and a designated direction according to the second embodiment. FIG. 14 shows a part of a spherical panoramic image frame on the solid sphere CS as in FIG. As shown in FIG. 14, a point CPa is designated as a designated point, and a line Da extending from the point CPa is designated as a line indicating a designated direction. A point opposite to the point CPa is a point CPb on the line Da. This designated content is also designated in a form including the coordinate values of the world coordinate system, but it may be coordinate values on the spherical panoramic image.

Then, when the attitude of the imaging capturing device 10 changes, the point CPa and the line Da move together. The display viewpoint correction unit 25 of the terminal 20 corrects each parameter of the spherical panoramic image frame by rotating the spherical panoramic image frame on the solid sphere CS so that the position of the point CPa on the solid sphere CS and the direction of the line Da do not change before and after the attitude change.

For example, when the attitude of the imaging capturing device 10 changes the roll angle θr, the pitch angle θp, and the yaw angle θy, the optical axis IAa of the virtual camera IC passing through the point CPa changes to the optical axis IAa1, and the point CPa is the optical axis moving to point CPa1 on IAa1. Furthermore, the direction vector Va indicating the direction of the line Da changes to the direction vector Va1. The direction vector Va may be a vector formed by the points CPa and CPb.

Therefore, the display viewpoint correction unit 25 moves the point CPa1 to the point CPa, and rotates the spherical panoramic image frame after the attitude change around the center of the solid sphere CS so that the direction of the direction vector Va1 matches the direction of the direction vector Va. That is, the display viewpoint correction unit 25 performs coordinate conversion to move the point CPa1 to the point CPa and make the direction of the direction vector Va1 coincide with the direction of the direction vector Va on the spherical panoramic image frame after the attitude change. In the spherical image frame after coordinate conversion, the position of the point CPa1 on the solid sphere CS is the same as the point CPa, and the direction vector Va1 is parallel to the direction vector Va.

Figure 15:
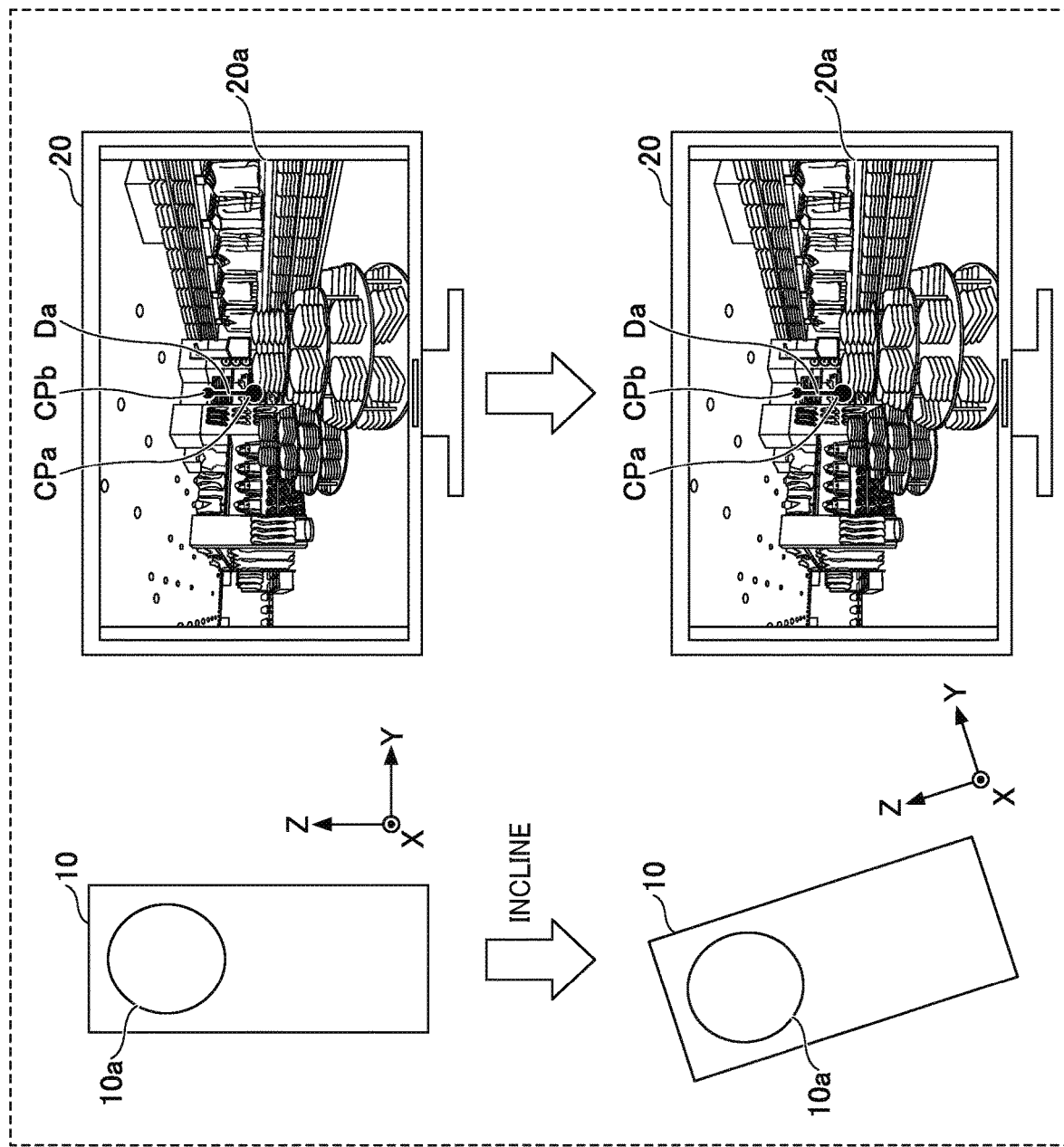
FIG. 15 is an example of a display image of a terminal before and after an attitude change of an imaging capturing device, according to a second embodiment of the present disclosure.

For example, FIG. 15 is an illustrating of an example of a display image of the terminal 20 before and after the attitude change of the imaging capturing device 10 according to the second embodiment. As shown in FIG. 15, in the image 20a displayed by the terminal 20, the point CPa and the line Da are designated by the user. Thereafter, for example, when the imaging capturing device 10 is rotated about the Y axis, the terminal 20 displays the image 20a maintained the position of the point CPa at the same position and the direction of the line Da in the same direction during and after the rotation. That is, the terminal 20 continues to display the image 20a of the same viewpoint and inclination.

In addition, since the other configuration and operation of the imaging system according to the second embodiment are the same as in the first embodiment, the description is omitted. Then, according to the imaging system according to the second embodiment as described above, the same effect as that of the first embodiment can be obtained.

Furthermore, in the imaging system according to the second embodiment, the display viewpoint correction unit 25 of the terminal 20 may correct the image captured by the imaging unit 11A so as to project the display portion in the display direction based on the attitude of the unit 11A, the display portion and display direction designated in the image. According to the above configuration, even if the attitude of the imaging unit 11A changes, the terminal 20 can display an image for projecting a display portion in the designated display direction. Therefore, the terminal 20 can project a desired display target in a desired direction regardless of the attitude of the imaging unit 11A.

In addition, in the imaging system according to the second embodiment, the display viewpoint correction unit 25 of the terminal 20 may correct the image captured by the imaging unit 11A so that the vertical direction axis of the image taken by the imaging unit 11A is in the zenith direction. The vertical direction axis of the image captured by the imaging unit 11A may correspond to the vertical direction axis set in the imaging unit 11A.

For example, the vertical direction axis set in the imaging unit 11A may be the Z axis. At this time, the display viewpoint correction unit 25 may use the vertical direction axis of the image corresponding to the Z axis instead of the line Da designated by the user. Then, the display viewpoint correction unit 25 may correct the image captured by the imaging unit 11A by using the point CPa and the vertical axis of the image designated by the user so that the position of the point CPa is maintained at the same position and the direction of the vertical axis of the image is maintained in the zenith direction. The zenith direction is the Zs axis direction of world coordinates. From the attitude of the imaging unit 11A, it is possible to detect the inclination direction and the inclination angle of the Z axis of the imaging unit 11A with respect to the Zs axis. Therefore, the display viewpoint correction unit 25 can perform correction as in the process described above in the second embodiment.

According to the above configuration, the terminal 20 can display an image for projecting the designated display portion in the zenith direction, which is the actual vertical direction.

In addition, the zenith correction function of correcting the image of the display viewpoint correction unit 25 may be selectable so that the vertical axis of the image is in the zenith direction. For example, when execution of the zenith correction function, that is, an instruction of ON is input by the user via the input device 204 of the terminal 20, the display viewpoint correction unit 25 may perform zenith correction. Furthermore, when to stop execution of the zenith correction function, that is, an instruction of OFF is input by user via the input device 204, the display viewpoint correction unit 25 may not perform the zenith correction.

In addition, in the imaging system according to the second embodiment, the display viewpoint correction unit 25 of the terminal 20 may correct so as to display the image captured by the imaging unit 11A in the display direction based on the attitude of the imaging unit 11A and the display direction (line Da designated by the user) designated by the image. Thereby, even if the attitude of the imaging unit 11A changes, the terminal 20 can display an image in the designated display direction, and can display in a desired direction regardless of the attitude of the imaging unit 11A.

Other Embodiments

As mentioned above, although exemplary implementations of embodiment of this invention have been described, this invention is not limited to these embodiments. That is, various modifications and improvements are possible within the scope of the present invention. For example, embodiments in which various modifications are applied to the embodiments, and a form constructed by combining components in different embodiments are also included in the scope of the present invention.

For example, in the imaging system according to the embodiment, the display viewpoint correction unit 25 of the terminal 20 corrects the spherical panoramic image frame so that the position of the designated region T or the point CPa. In this case which is an example of the display portion designated in the image, there is no dependency on the change of the attitude of the imaging capturing device 10 and it can be kept in the same position on the image, but it is not limited to this.

For example, the display viewpoint correction unit 25 may not correct the spherical panoramic image frame, when the designated area T or the point CPa fits within a predetermined display area on the image even if the attitude of the imaging device 10 changes. The display viewpoint correction unit 25 may correct the spherical panoramic image frame, when the designated area T or the point CPa does not fit within a predetermined area on the image if the attitude of the imaging device 10 changes. For example, the predetermined area may be an area centered on the designated area T or the position of the point CPa when designated by the user. Thereby, the user can visually recognize the designated area T or the point CPa without largely changing the viewpoint.

Alternatively, the display viewpoint correction unit 25 may correct the spherical panoramic image frame so that the position of the designated area T or the point CPa is maintained at a predetermined position such as the center of the image even if the attitude of the imaging capturing device 10 changes. The center of the image may be at the center of the optical axis.

Further, in the imaging system according to the embodiment, the display viewpoint correction unit 25 of the terminal 20 may correct the image captured by the imaging unit 11A so that the oscillation of the display portion on the image due to the change of the attitude of the imaging unit 11A is suppressed for the designated display portion such as the designated area T or the point CPa and so on.

For example, the attitude data acquisition unit 24 of the terminal 20 may detect a cycle in which the direction of the change the attitude of the imaging capturing device 10 changes (hereinafter, also referred to as a "attitude change cycle") and an amount of change in the attitude of the imaging capturing device 10 in each of the change directions of the attitude from the attitude data of the imaging capturing device 10. Then, the display viewpoint correction unit 25 may correct the image so as to maintain the position of the display portion in the image, when the attitude change cycle is equal to or less than the first threshold and the amount of change in attitude in the cycle is equal to or less than the second threshold. In this case, it can be considered that the imaging capturing device 10 vibrates due to a shake of the user holding the imaging capturing device 10. In addition, the display viewpoint correction unit 25 may not correct the image when the attitude change cycle is greater than the first threshold and the amount of change in posture in the cycle is equal to or less than the second threshold. Further, the display viewpoint correction unit 25 may correct the image so as to maintain the position of the display portion in the image when the amount of change in posture in the posture change cycle is greater than the second threshold.

According to the above configuration, the terminal 20 can project a desired display target regardless of the attitude of the imaging capturing device 10 while suppressing the shaking of the screen caused by the camera shake of the user holding the imaging capturing device 10 and so on.

In addition, the oscillation suppression function for correcting the image of the display viewpoint correction unit 25 may be selectable so as to suppress the swing of the display portion on the image due to the change of the posture of the imaging unit 11A. For example, when execution of the oscillation suppression function, that is, an instruction of ON is input by the user via the input device 204 of the terminal 20, the display viewpoint correcting unit 25 may perform the above correction to suppress the oscillation. For example, when to stop execution of the oscillation suppression function, that is, an instruction of OFF is input by the user via the input device 204 of the terminal 20, the display viewpoint correcting unit 25 may not perform the above correction to suppress the oscillation.

Further, in the imaging system according to the embodiment, the imaging control unit 11 of the imaging capturing device 10 combines two image frames captured by the first imaging element 11ab and the second imaging element 11bb to generate a spherical panoramic image frame, but it is not limited and may not be combined with the spherical panoramic image frame. For example, the imaging control unit 11 may output the two image frames to the video compression unit 12 without combining the two image frames. And the video compression unit 12 may generate two data of video format from each of the two image frames and may transmit them to the terminal 20 via the unit 15. In this case, the imaging device 10 may transmit to the terminal 20, camera information including the direction of the optical axis center and the imaging direction, which are respectively set in the cameras 11a and 11b. Then, the terminal 20 may combine the image frames obtained by expanding each of the two video format data which were captured at the same time or an approximate time based on camera information, and may generate a spherical panoramic image frame. Alternatively, the terminal 20 may display two images on the display 205 without combining image frames obtained from each two data of the video format.

Furthermore, in the imaging system according to the embodiment, the imaging control unit 11 of the imaging capturing device 10 combines the two image frames captured by the first imaging element 11ab and the second imaging element 11bb to generate the spherical panoramic image frame, but it is not limited to the above. The imaging control unit 11 may not combine them into a spherical panoramic image frame. For example, the imaging control unit 11 may output the two image frames to the video compression unit 12 as a so-called dual fisheye image, and the video compression unit 12 may generate the data of the video format from the dual fisheye image and transmit the data to the terminal 20 via the unit 15. In this case, the imaging capturing device 10 may transmit, to the terminal 20, camera information including the direction of the optical axis center and the imaging direction, which are respectively set in the cameras 11a and 11b. Then, the terminal 20 may combine the image frames obtained by expanding the two video format data which were captured at the same time or approximately the same time based on camera information and so on and may generate a spherical panoramic image frame. Alternatively, the terminal 20 may display two images on the display 205 without combining image frames obtained from each two data of the video format.

Moreover, in the imaging system according to the embodiment, although the image captured by the imaging capturing device 10 was transmitted to the terminal 20 via the communication network 30, the embodiment is not limited to this way of operating. Transmission of an image from the imaging capturing device 10 to terminal 20 may be performed via any wire communication or wireless communication. Alternatively, the image may be stored in the storage medium from the imaging capturing device 10, and the terminal 20 may acquire the image by reading the image from the storage medium. Alternatively, the image may be stored in the storage medium from the imaging device 10, and the terminal 20 may acquire the image by reading the image from the storage medium.

Further, in the imaging system according to the embodiment, the functions of the display image generator 23 and the display viewpoint correction unit 25 of the terminal 20 may be included in the imaging capturing device 10. The imaging device 10 may perform the same processing as the display image generator 23 and the display viewpoint correction unit 25 before the processing in the video compression unit 12. At this time, the image after correction is transmitted from the imaging capturing device 10 to the terminal 20.

In addition, the imaging system according to the embodiment may include a server device connected to the communication network 30. The imaging device 10 may transmit an image to a server device, and the server device may simultaneously distribute or broadcast the image to one or more terminals 20 connected to the communication network 30. In this case, the functions of the display image generator 23 and the display viewpoint correction unit 25 of the terminal 20 may be provided in any of the imaging capturing device 10, the server device, and each terminal 20.

When provided in the server device, the designation of the display portion in each terminal 20 may be transmitted from the terminal 20 to the server device. The server device performs the same processing as the display image generator 23 and the display viewpoint correction unit 25 to generate an image after correction for each display portion, and may distribute the corrected image corresponding to designation of the display portion to each terminal 20. Alternatively, the server device may generate an image in which the images after correction for each display portion are aggregated, and may distribute the aggregated image to each terminal 20. In this case, one image includes the images of all display portions.

When provided in the imaging capturing device 10, the designation of the display portion of each terminal 20 may be transmitted from each terminal 20 to the server device. The server device may aggregate information of the display portion of each terminal 20 and transmit it to the imaging device 10. The imaging device 10 may perform the same processing as the display image generation unit 23 and the display viewpoint correction unit 25 to generate a corrected image of each display portion and transmit the generated image to the server device. Then, the server device may distribute the corrected image corresponding to the designated display portion to each terminal 20. Alternatively, the imaging device 10 may generate an image in which the images after correction for each display portion are aggregated, and may transmit the aggregated image to the server device.

Moreover, when provided in each terminal 20, the image captured by the imaging capturing device 10 may be transmitted to each terminal 20 via a server device. Each terminal 20 may generate an image after correction for a display portion designated in the terminal 20.

Further, in the terminal 20 of the imaging system according to the embodiment, one display portion is designated by the user via the input device 204, and the display viewpoint correction unit 25 corrects the image so that the position of the one display part is maintained, but the present invention is not limited thereto. For example, a plurality of display portions may be designated via the input device 204. In this case, the display viewpoint correction unit 25 may generate, for each of the plurality of display portions, a plurality of correction images in which the position of the display portion is maintained. The display control unit 26 may cause the display 205 to display a plurality of correction images in order or may simultaneously display at least two of the plurality of correction images.

Furthermore, the present invention may be a non-transitory computer readable recording medium having a program recorded thereon. Further, it goes without saying that the program can be distributed via a transmission medium such as the Internet.

For example, a program according to an embodiment of the present invention is a program to be executed by a computer of a terminal, and includes a process for acquiring an image captured by an imaging unit and information on the attitude of the imaging unit, a process of correcting the acquired image so as to project the display part based on the attitude of the imaging unit and the display part designated in the image, and a process of displaying the image after correction. According to this program, the same effect as that of the terminal 20 can be obtained.

In the correction processing, the program may correct the acquired image based on an attitude of the imaging unit, the display portion and the display direction designated in the image so as to display that display portion in that display direction.

Further, in the correction process, the program may correct the acquired image so that the vertical axis of the acquired image is in the zenith direction, and the vertical direction axis may correspond to a vertical direction axis set in the imaging unit.

In the correction processing, the program may correct the acquired image so as to suppress oscillation of the display portion on the image due to a change in attitude of the imaging unit.

In the correction processing, the program may correct the acquired image so as to maintain the position of the display portion with respect to the image regardless of a change in attitude of the imaging unit.

Further, in the program, the attitude of the imaging unit may include the attitude of the imaging unit in the yawing, pitching, and rolling directions.

Further, the numerals such as ordinal numbers and quantities used above are all illustrated to specifically explain the technology of the present invention, and the present invention is not limited to the illustrated numerals. Also, the connection relationship between components is illustrated to specifically explain the technology of the present invention, and the connection relationship that implements the functions of the present invention is not limited to this.

Also, division of blocks in the functional block diagram is an example, and a plurality of blocks may be realized as one block, one block may be divided into a plurality, and/or some functions may be transferred to another block. Also, a single piece of hardware or software may process the functions of a plurality of blocks having similar functions in parallel or in time division.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. Further, the term "circuitry" and "processing circuitry" is not limited to a single circuit, board, or device, but may include circuitry or processing circuitry distributed in a plurality of devices.

Obviously, numerous modifications and variations of the present invention are possible in light of the above teachings. It is therefore to be understood that within the scope of the appended claims, the invention may be practiced otherwise than as specifically described herein.

The invention claimed is:

1. An image system, comprising:
processing circuitry configured to:
capture an image using a device including a lens, an image sensor which receives light from the lens, and an attitude sensor;
detect an attitude of the device using the attitude sensor;
input a designation for a displayed image which was captured by the device, the input designation including a point on the image and at least one of a region of the image and a direction;
correct the image captured by the device based on the attitude of the device and the designation;
display at least a portion of the image captured by the device which has been corrected;
the device; and
a terminal which includes the processing circuitry configured to input the designated portion, correct the image, and display the at least a portion of the image which has been corrected,
wherein the device comprises:
first processing circuitry configured to:
generate video data from a plurality of images captured by the device;
detect the attitude of the device; and
transmit the video data and the attitude of the device to the terminal,
wherein the terminal comprises:
second processing circuitry configured to:
expand the video data into individual images; and
correct the images captured by the device so as to correct and display at least the portion based on the attitude of the device and the designation.

2. The image system according to claim 1, wherein the processing circuitry is further configured to:
input the designation which includes the point on the image and the direction, and
correct the image captured by the device based on the attitude of the device and the designation which includes the point on the image and the direction.

3. The image system according to claim 1, wherein:
the processing circuitry is further configured to correct the image captured by the device so that a vertical direction axis of the image captured by the device is in a zenith direction, and
the vertical direction axis corresponds to a vertical axis set in the device.

4. The image system according to claim 1, wherein:
the processing circuitry is further configured to correct the image captured by the device so as to suppress oscillation of the at least the portion of the image which is displayed due to a change in attitude of the device.

5. The image system according to claim 1, wherein:
the processing circuitry is further configured to correct the image captured by the device so as to maintain a position of the at least the portion of the image which is displayed regardless of a change in the attitude of the device.

6. The image system according to claim 1, wherein the attitude of the device includes a yaw, a pitch, and a roll of the device.

7. A system comprising:
processing circuitry configured to:
acquire an image which has been captured by a device and information of an attitude of the device;
correct the image which has been acquired based on the attitude of the device and a designation including a point on the image and at least one of a region of the image and a direction;
display at least a portion of the image which has been corrected;
the device; and
a terminal which includes processing circuitry configured to input a designated portion of the image, correct the image, and display the at least a portion of the image,
wherein the device comprises:
first processing circuitry configured to:
generate video data from a plurality of images captured by the device;
detect the attitude of the device; and
transmit the video data and the attitude of the device to the terminal,
wherein the terminal comprises:
second processing circuitry configured to:
expand the video data into individual images; and
correct the images captured by the device so as to correct and display at least the portion based on the attitude of the device and the designation.

8. The system according to claim 7, wherein the processing circuitry is further configured to:
correct the image captured by the device based on the attitude of the device and the designation which includes the point on the image and the direction; and
display the at least the portion of the image which has been corrected.

9. The system according to claim 7, wherein:
the processing circuitry is further configured to correct the image captured by the device so that a vertical direction axis of the image captured by the device is in a zenith direction, and
the vertical direction axis corresponds to a vertical axis set in the device.

10. The system according to claim 7, wherein:
the processing circuitry is further configured to correct the image captured by the device so as to suppress oscillation of the at least the portion of the image which is displayed due to a change in attitude of the device.

11. The system according to claim 7, wherein:
the processing circuitry is further configured to correct the image captured by the device so as to maintain a position of the at least the portion of the image which is displayed regardless of a change in the attitude of the device.

12. The system according to claim 7, wherein the attitude of the device includes a yaw, a pitch, and a roll of the device.

13. A non-transitory computer-readable recording medium that contains computer instructions which when executed by a computer perform:
acquiring an image which has been captured by a device and information of an attitude of the device;
correcting the image which has been acquired based on the attitude of the device and a designation including a point on the image and at least one of a region of the image and a direction;

displaying at least a portion of the image which has been corrected;
generating video data from a plurality of images captured by the device;
detecting the attitude of the device;
transmitting the video data and the attitude of the device to the terminal,
expanding the video data into individual images; and
correcting the images captured by the device so as to correct and display at least the portion based on the attitude of the device and the designation.

14. The non-transitory computer-readable recording medium according to claim 13, wherein the correcting further causes the computer to perform:
correcting the image captured by the device so that a vertical direction axis of the image captured by the device is in a zenith direction.

15. The non-transitory computer-readable recording medium according to claim 13, wherein the correcting further causes the computer to perform:
correcting the image captured by the device so as to suppress oscillation of the at least the portion of the image which is displayed due to a change in attitude of the device.

16. The non-transitory computer-readable recording medium according to claim 13, wherein the correcting further causes the computer to perform:
correcting the image captured by the device so as to maintain a position of the at least the portion of the image which is displayed regardless of a change in the attitude of the device.

17. The non-transitory computer-readable recording medium according to claim 13, wherein the correcting further causes the computer to perform:
correcting the image which has been acquired based on the attitude which includes a yawing direction, a pitching direction, and a rolling direction of the device.

* * * * *